US012036641B2

(12) United States Patent
Iwatani et al.

(10) Patent No.: US 12,036,641 B2
(45) Date of Patent: Jul. 16, 2024

(54) POWER TOOL

(71) Applicant: MAKITA CORPORATION, Anjo (JP)

(72) Inventors: Takuma Iwatani, Anjo (JP); Makoto Chikaraishi, Anjo (JP); Kisho Sekido, Anjo (JP); Akira Ito, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/499,267

(22) Filed: Nov. 1, 2023

(65) Prior Publication Data

US 2024/0189973 A1 Jun. 13, 2024

(30) Foreign Application Priority Data

Dec. 13, 2022 (JP) ................................ 2022-198394

(51) Int. Cl.
*B25B 23/18* (2006.01)
*F21V 33/00* (2006.01)

(52) U.S. Cl.
CPC .......... *B25B 23/18* (2013.01); *F21V 33/0084* (2013.01)

(58) Field of Classification Search
CPC ............................ B25B 23/18; F21V 33/0084
USPC ........................................................ 362/119
See application file for complete search history.

(56) References Cited

U.S. PATENT DOCUMENTS 5,169,225 A * 12/1992 Palm ...................... B25F 5/021 362/118
6,206,538 B1 * 3/2001 Lemoine .................. H01H 9/06 362/89
9,923,249 B2 * 3/2018 Rejman ...................... B25F 5/02
11,472,016 B2 * 10/2022 Gisselman .............. B25F 5/001
11,835,217 B2 * 12/2023 Friedman .................. F21S 9/02
2004/0174699 A1 * 9/2004 Minalga .................. B25B 23/18 362/119
2005/0135084 A1 * 6/2005 Chen ....................... B25B 21/00 362/109
2016/0354889 A1 12/2016 Ely et al.

FOREIGN PATENT DOCUMENTS

JP 2021024044 A 2/2021

* cited by examiner

*Primary Examiner* — Laura K Tso
(74) *Attorney, Agent, or Firm* — J-TEK LAW PLLC; Jeffrey D. Tekanic; Scott T. Wakeman

(57) ABSTRACT

A power tool (1; 101) includes: a motor (6; 106) having a stator (61) and a rotor (63), which is rotatable relative to the stator; an output part (8; 108) disposed more forward than the motor and configured to be rotated by the motor; a motor-housing part (21; 121), which houses the motor; a grip part (22; 122) disposed downward of the motor-housing part; a battery-holding part (23; 123) disposed downward of the grip part; and a COB light (50) disposed on the battery-holding part.

20 Claims, 15 Drawing Sheets

[OVERALL CIRCUIT CONFIGURATION IN THE SITUATION OF FOUR LEDS]

[SERIES CONNECTION IN THE SITUATION OF FOUR LEDS]

[PARALLEL CONNECTION IN THE SITUATION OF FOUR LEDS]

[OVERALL CIRCUIT CONFIGURATION IN THE SITUATION OF SIX LEDS]

[SERIES CONNECTION IN THE SITUATION OF SIX LEDS]

[PARALLEL CONNECTION IN THE SITUATION OF SIX LEDS]

POWER TOOL

CROSS-REFERENCE TO RELATED APPLICATION

This application claims priority to Japanese patent application no. 2022-198394 filed on Dec. 13, 2022, the contents of which are fully incorporated herein by reference.

TECHNICAL FIELD

Techniques disclosed in the present specification relate to a power tool, such as without limitation to a driver-drill, a hammer driver-drill, an impact driver, an impact wrench and a polisher.

BACKGROUND ART

Japanese Laid-open Patent Publication 2021-024044 discloses a power tool that comprises an output shaft, on which a tool accessory is mounted, and a light unit, which illuminates a work object.

SUMMARY OF THE INVENTION

When a portion of the light emitted from a light unit illuminates a tool accessory, there is a possibility, for example, that a shadow will be adversely created on the work object owing to the tool accessory being disposed in the illumination path between the light unit and the work object. If a shadow is created on the work object, then there is a possibility that it will become difficult for the user to visually perceive the work object during a power tool operation. In addition, if the luminous intensity of the light emitted from the light unit is low, there is a possibility that it will become difficult for the user to visually perceive the work object during a power tool operation.

It is one non-limiting object of the present teachings to disclose techniques that make it easier to visually perceive a work object (workpiece) during a power tool operation.

According to one non-limiting aspect of the present teachings, a power tool may comprise: a motor comprising a stator and a rotor, which is rotatable relative to the stator; an output shaft, which is disposed more forward than the motor and is rotated by the motor; a motor-housing part, which houses the motor; a grip part, which is disposed downward of the motor-housing part; a battery-holding part, which is disposed downward of the grip part; and a COB light, which is disposed on the battery-holding part.

Such a design makes it easier to visually perceive a work object during a power tool operation.

DETAILED DESCRIPTION OF THE INVENTION

Figure 1:
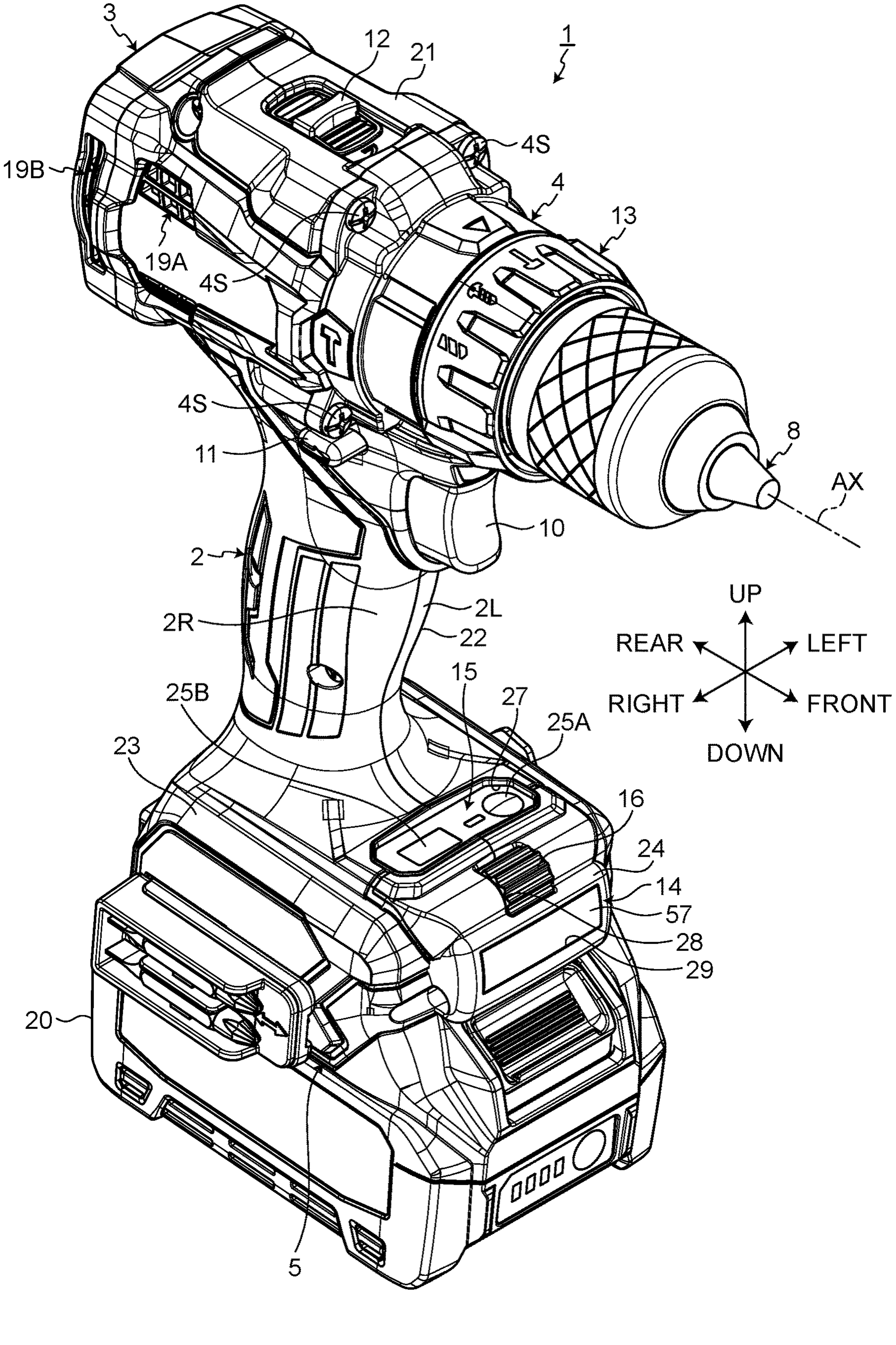
FIG. 1 is an oblique view, viewed from the front, that shows a driver-drill according to a representative, non-limiting embodiment according to the present teachings.

As was mentioned above, a power tool according to the present teachings may comprise: a motor comprising a stator and a rotor, which is rotatable relative to the stator; an output shaft, which is disposed more forward than the motor and is rotated by the motor; a motor-housing part, which houses the motor; a grip part, which is disposed downward of the motor-housing part; a battery-holding part, which is disposed downward of the grip part; and a COB light, which is disposed on the battery-holding part.

According to the above-mentioned configuration, high-intensity light can be emitted from the COB light, which is disposed more downward than the grip part. Thereby, a work object can be brightly illuminated. In addition, a shadow of a tool accessory tends not to be formed on the work object. Consequently, it becomes easier for a user to visually perceive the work object during a power tool operation.

In one or more embodiments, the COB light may be disposed on a front portion of the battery-holding part.

According to the above-mentioned configuration, a work object, which is forward of the battery-holding part, can be brightly illuminated.

In one or more embodiments, the COB light may comprise a board (e.g., a circuit board) and an LED device or LED devices, which is (are) installed on a front surface of the board. The board may be elongate in the left-right direction.

According to the above-mentioned configuration, a large area of the work object can be illuminated.

In one or more embodiments, multiple LED devices may be installed spaced apart in the left-right direction.

According to the above-mentioned configuration, although a portion of the light emitted from the LED devices is radiated onto the tool accessory, because the LED devices are installed spaced apart in the left-right direction, the shadows of the tool accessory cancel each other out. As a result, the shadow(s) formed on the work object is (are) no longer conspicuous. Accordingly, it becomes easier for the user to visually perceive the work object during a power tool operation.

In one or more embodiments, the power tool may comprise an optical member, which is disposed more forward than the COB light and comprises a light-transmitting part, through which light emitted from the COB light transmits (transits).

According to the above-mentioned configuration, the light that has transmitted through the optical member is radiated onto the work object.

In one or more embodiments, the optical member may be disposed in a light opening, which is provided in the battery-holding part.

According to the above-mentioned configuration, the light that has transmitted through the optical member is radiated onto the work object without loss.

In one or more embodiments, the optical member may be made of a polycarbonate resin that contains a white diffusing agent.

According to the above-mentioned configuration, because the optical member has a milky white color, the outer shape of devices, such as the LED devices of the COB light, are difficult to visually perceive from outside of the power tool. Because the outer shapes of the devices are difficult to visually perceive, the design aesthetics of the power tool are improved.

In one or more embodiments, the light transmittance of the optical member may be 40% or more and 70% or less.

According to the above-mentioned configuration, the outer shapes of the devices of the COB light are difficult to visually perceive from outside of the power tool. Because the outer shapes of the devices are difficult to visually perceive, the design aesthetics of the power tool are improved.

In one or more embodiments, the optical member may have: an incident surface, on which light from the COB light impinges; a fully reflecting surface, which fully reflects light from the COB light; and an emergent surface, from which light from the incident surface and light from the fully reflecting surface emerge.

According to the above-mentioned configuration, although a portion of the light emitted from the COB light does not impinge on the incident surface of the light-transmitting part, loss of light emitted from the COB light is reduced because the light emitted from the COB light is reflected by the fully reflecting surface and emerges from the emergent surface.

In one or more embodiments, the fully reflecting surface may be disposed more upward than the incident surface.

According to the above-mentioned configuration, although a portion of the light emitted from the COB light does not advance upward of the light-transmitting part, loss of light emitted from the COB light is reduced because the light emitted from the COB light is reflected by the fully reflecting surface and emerges from the emergent surface.

In one or more embodiments, the optical member may comprise an upper-side enclosing part, which extends rearward from an upper-end portion of the light-transmitting part, and an upper-side protruding part, which protrudes upward from the upper-side enclosing part. The fully reflecting surface may be disposed on the upper-side protruding part.

According to the above-mentioned configuration, the upper-side protruding part, which has the fully reflecting surface, can be caused to function as a positioning part of the optical member with respect to the battery-holding part.

In one or more embodiments, the optical member may comprise a lower-side enclosing part, which extends rearward from a lower-end portion of the light-transmitting part, and a lower-side protruding part, which protrudes downward from the lower-side enclosing part.

According to the above-mentioned configuration, the lower-side protruding part can be caused to function as a (another) positioning part of the optical member with respect to the battery-holding part. In addition, the upper-side protruding part and the lower-side protruding part can be caused to function as rotation-stop parts of the optical member with respect to the battery-holding part.

In one or more embodiments, the COB light may comprise a board and an LED device or LED devices, which is (are) installed on a front surface of the board. An angle formed between a rotational axis of the motor and a normal line to the front surface of the board may be 5° or more and 20° or less.

According to the above-mentioned configuration, the work object can be properly illuminated, centered on the tool accessory.

In one or more embodiments, the COB light may comprise a board (e.g., a circuit board) and LED devices, which are installed on a front surface of the board. At least four of the LED devices may be installed spaced apart in the left-right direction. The LED devices of a first group of the LED devices, which includes a first LED device and a second LED device, may be electrically connected in series; the LED devices of a second group of the LED devices, which includes a third LED device and a fourth LED device, may be electrically connected in series; and the first group of LED devices and the second group of LED devices may be electrically connected in parallel. In the left-right direction, the second group of LED devices may be disposed between the first LED device and the second LED device.

According to the above-mentioned configuration, even if an imbalance occurs between the luminous intensity of the light emitted from the first group of LED devices and the luminous intensity of the light emitted from the second group of LED devices due to an imbalance in the electric currents supplied to the COB light, the difference between the left and right luminous intensities at the work object can be made small.

In one or more embodiments, the LED devices of a third group of the LED devices, which includes a fifth LED device and a sixth LED device, may be electrically connected in series; the first group of LED devices, the second group of LED devices, and the third group of LED devices may be electrically connected in parallel; and in the left-right direction, the second group of LED devices may be disposed between the first LED device and the second LED device, and the third group of LED devices may be disposed between the third LED device and the fourth LED device.

According to the above-mentioned configuration, even if an imbalance occurs between the luminous intensity of the light emitted from the first group of LED devices and the luminous intensity of the light emitted from the second group of the LED devices due to an imbalance in the electric currents supplied to the COB light, the luminous-flux intensities at the work object can be made uniform.

In one or more embodiments, a power tool may comprise: a motor comprising a stator and a rotor, which is rotatable relative to the stator; an output shaft, which is rotated by the rotor; a housing, which houses the motor; and a COB light, which is disposed on the housing. The rated voltage of a battery held by a battery-holding part of the housing may be 25.2 V or more.

According to the above-mentioned configuration, because the COB light can be driven at a high voltage, the work object can be brightly illuminated. Consequently, it becomes easier for the user to visually perceive the work object during a power tool operation.

In one or more embodiments, a power tool may comprise: a motor comprising a stator and a rotor, which is rotatable relative to the stator; an output shaft, which is rotated by the rotor; a housing, which houses the motor; and a COB light, which is disposed on the housing. The rated voltage of a battery held by a battery-holding part of the housing may be 21.6 V or more; and the voltage of the battery may be applied, without being stepped down, to the COB light.

According to the above-mentioned configuration, because the COB light can be driven at a high voltage, the work object can be brightly illuminated. Consequently, it becomes easier for the user to visually perceive the work object during a power tool operation.

In one or more embodiments, the COB light may comprise a board (e.g., a circuit board) and LED devices, which are installed on the board. At least six of the LED devices may be installed. The at least six LED devices may be electrically connected in series.

According to the above-mentioned configuration, owing to the at least six LED devices, which are connected in series, the work object can be brightly illuminated. Consequently, it becomes easier for the user to visually perceive the work object during a power tool operation.

Embodiments according to the present disclosure will be explained below, with reference to the drawings, but the present disclosure is not limited thereto. Structural elements of the embodiments explained below can be combined where appropriate. In addition, there are also situations in which some of the structural elements are not used.

In the embodiments, positional relationships among the parts are explained using the terms left, right, front, rear, up, and down. These terms indicate relative position or direction, wherein the center of the power tool is the reference.

The power tool comprises the motor. In the embodiments, the direction parallel to rotational axis AX of the motor is called the axial direction where appropriate, the direction that goes around rotational axis AX is called the circumferential direction or the rotational direction where appropriate, and the radial direction of rotational axis AX is called the radial direction where appropriate.

In the embodiments, rotational axis AX extends in a front-rear direction. The axial direction and the front-rear direction coincide with each other. One side in the axial direction is forward, and the other side in the axial direction is rearward. In addition, in the radial direction, a location that is proximate to or a direction that approaches rotational axis AX is called radially inward where appropriate, and a location that is distant from or a direction that leads away from rotational axis AX is called radially outward where appropriate.

In some of the embodiments, the power tool is a driver-drill (optionally, a hammer driver-drill), which is one type of screw-tightening tool. The power tool is called a driver-drill where appropriate.

Overview of Driver-Drill

Figure 2:
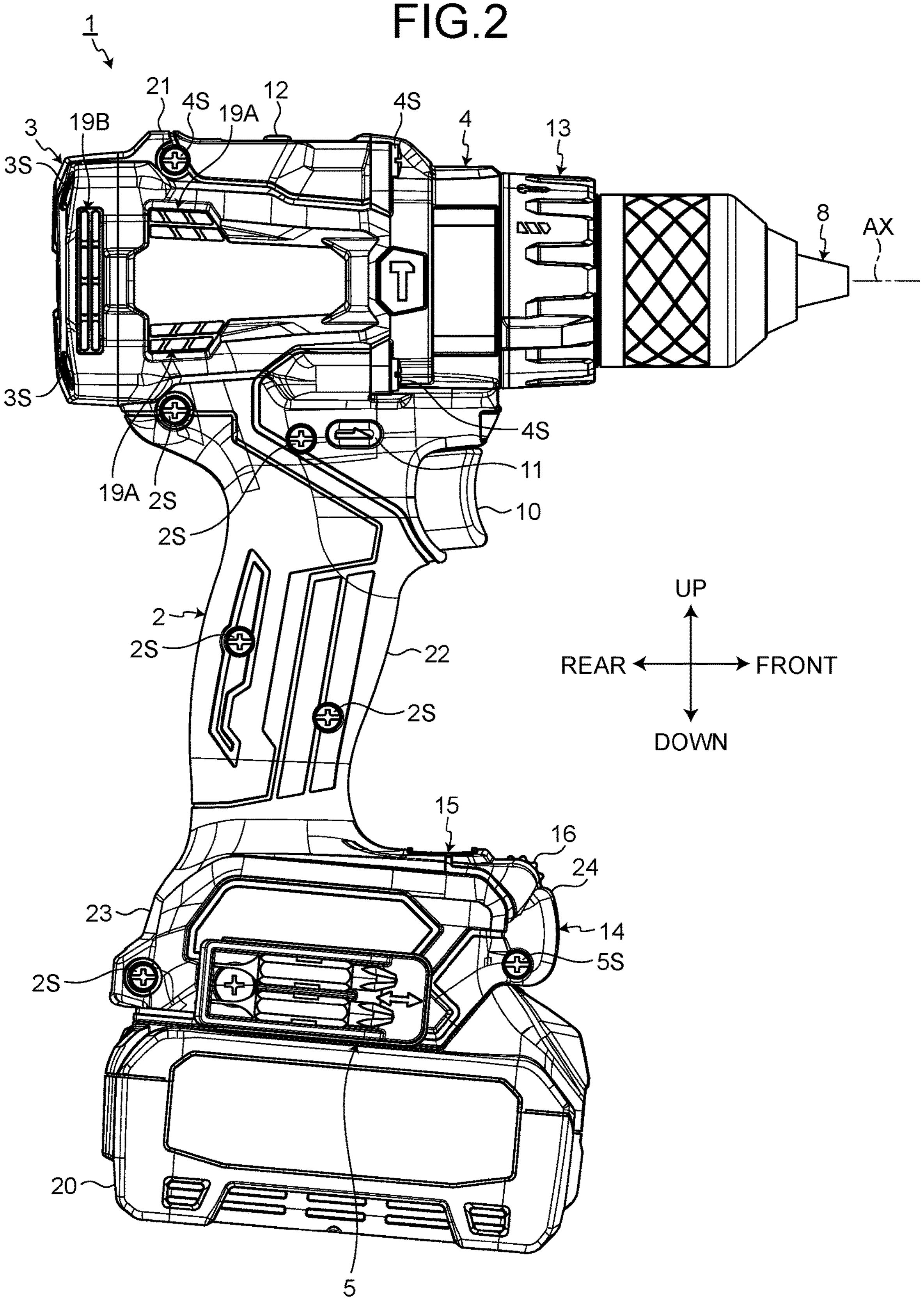
FIG. 2 is a side view that shows the driver-drill according to the embodiment.
Figure 3:
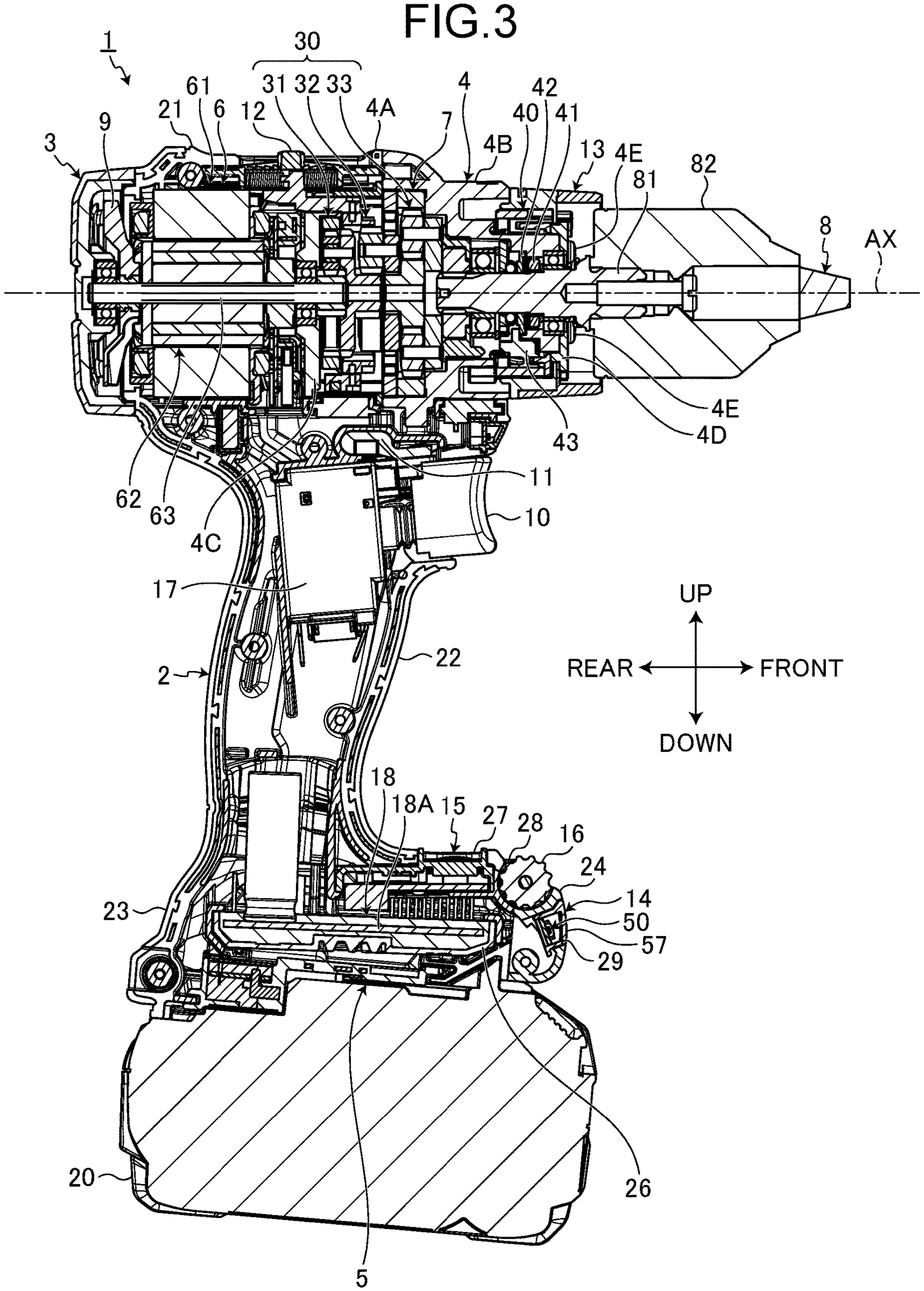
FIG. 3 is a cross-sectional view that shows the driver-drill according to the embodiment.

FIG. 1 is an oblique view, viewed from the front, that shows a driver-drill) 1 according to the embodiment. FIG. 2 is a side view that shows the driver-drill 1 according to the embodiment. FIG. 3 is a cross-sectional view that shows the driver-drill 1 according to the embodiment. In the present embodiment, the driver-drill 1 is, more specifically, a hammer driver-drill.

As shown in FIG. 1, FIG. 2, and FIG. 3, the driver-drill 1 comprises a housing 2, a rear cover 3, a casing 4, a battery-mounting part 5, a motor 6, a power-transmission mechanism 7, an output part 8, a fan 9, a trigger lever 10, a forward/reverse-change lever 11, a speed-changing lever 12, a mode-changing ring (action mode change ring) 13, a light unit 14, a user interface panel 15, a dial 16, and a controller 18.

The housing 2 is made of a synthetic resin. In the present embodiments, the housing 2 is made of nylon (polyamide). The housing 2 includes a left housing 2L and a right housing 2R. The left housing 2L and the right housing 2R are affixed by the screws 2S. The housing 2 is formed by affixing the left housing 2L and the right housing 2R.

The housing 2 comprises a motor-housing part 21, a grip part 22, a battery-holding part 23, and a light-holding part 24.

The motor-housing part 21 houses the motor 6. The motor-housing part 21 has a tubular shape.

The grip part 22 is configured to be gripped by the user during a power tool operation. The grip part 22 is disposed downward of the motor-housing part 21. The grip part 22 extends downward from the motor-housing part 21. The trigger lever 10 is disposed at a front portion of the grip part 22.

The battery-holding part 23 houses the controller 18. The battery-holding part 23 holds a battery 20 via the battery-mounting part 5. The battery-holding part 23 is disposed downward of the grip part 22. The battery-holding part 23 is connected to a lower-end portion of the grip part 22. In both the front-rear direction and the left-right direction, the dimension of the outer shape of the battery-holding part 23 is larger than the dimension of the outer shape of the grip part 22.

The light-holding part 24 holds the light unit 14. The light-holding part 24 is fixed to a front portion of the battery-holding part 23 by one or more screws 5S. The light-holding part 24 may be regarded as a portion of the battery-holding part 23. For example, the battery-holding part 23 may be regarded as a first battery-holding part, and the light-holding part 24 may be regarded as a second battery-holding part.

The rear cover 3 is made of a synthetic resin, such as nylon (polyamide). The rear cover 3 is disposed rearward of the motor-housing part 21. The rear cover 3 houses the fan 9. The rear cover 3 is disposed so as to cover an opening in a rear portion of the motor-housing part 21. The rear cover 3 is fixed to the motor-housing part 21 by screws 3S.

The motor-housing part 21 has air-intake ports 19A. The rear cover 3 has air-exhaust ports 19B. Air surrounding the housing 2 flows into the interior space of the housing 2 via the air-intake ports 19A. Air in the interior space of the housing 2 flows out to the exterior of the housing 2 via the air-exhaust ports 19B.

The casing 4 houses the power-transmission mechanism 7. The casing 4 comprises a first casing 4A and a second casing 4B. The second casing 4B is disposed forward of the first casing 4A. The mode-changing ring 13 is disposed forward of the second casing 4B. The first casing 4A is made of a synthetic resin. The second casing 4B is made of a metal. In the embodiment, the second casing 4B is made of aluminum. The casing 4 is disposed forward of the motor-housing part 21. Both the first casing 4A and the second casing 4B have a tubular shape.

The first casing 4A is fixed to a rear-end portion of the second casing 4B. An opening in a rear-end portion of the first casing 4A is covered by a bracket plate 4C. An opening in a front-end portion of the second casing 4B is covered by a stop plate 4D. The stop plate 4D is fixed to the front-end portion of the second casing 4B by screws 4E.

The casing 4 is disposed so as to cover an opening in a front portion of the motor-housing part 21. The first casing 4A is disposed in the interior of the motor-housing part 21. The second casing 4B is fixed to the motor-housing part 21 by screws 4S.

The battery-mounting part 5 is formed at a lower portion of the battery-holding part 23. The battery-mounting part 5 is physically and electrically connected to the battery 20. The battery 20 is mounted on the battery-mounting part 5. The battery 20 is detachable from the battery-mounting part 5. The battery 20 comprises secondary batteries. In the embodiment, the battery 20 comprises rechargeable lithium-ion batteries. When mounted on the battery-mounting part 5, the battery 20 can supply electric power to the driver-drill 1. The motor 6 is driven using electric power supplied from the battery 20. The user interface panel 15 and the controller 18 operate using electric power supplied from the battery 20.

The motor 6 is the motive power supply of the driver-drill 1. The motor 6 is an inner-rotor-type brushless motor. The motor 6 is housed in the motor-housing part 21. The motor 6 comprises a stator 61, which has a tubular shape, and a rotor 62, which is disposed in the interior of the stator 61. The rotor 62 comprises a rotor shaft 63, which extends in the axial direction. The rotor 62 is rotatable relative to the stator 61.

The power-transmission mechanism 7 is disposed forward of the motor 6. The power-transmission mechanism 7 is housed in the casing 4. The power-transmission mechanism 7 operably couples the rotor shaft 63 to the output part 8. The power-transmission mechanism 7 transmits motive power generated by the motor 6 to the output part 8. The power-transmission mechanism 7 comprises a plurality of gears, as will be further explained below.

The power-transmission mechanism 7 comprises a speed-reducing mechanism 30 and a hammer (percussion) mechanism 40.

The speed-reducing mechanism 30 reduces the rotational speed of the rotor shaft 63 (while increasing torque) and causes the output part 8 to rotate at a rotational speed that is lower than that of the rotor shaft 63 (but with higher torque). In the present embodiment, the speed-reducing mechanism 30 comprises a first planetary-gear mechanism 31, a second planetary-gear mechanism 32, and a third planetary-gear mechanism 33. The second planetary-gear mechanism 32 is disposed forward of the first planetary-gear mechanism 31. The third planetary-gear mechanism 33 is disposed forward of the second planetary-gear mechanism 32. The speed-reducing mechanism 30, which comprises the first planetary-gear mechanism 31, the second planetary-gear mechanism 32, and the third planetary-gear mechanism 33, is disposed forward of the rotor 62. The gears of the first planetary-gear mechanism 31, the second planetary-gear mechanism 32, and the third planetary-gear mechanism 33 are each rotated by the rotor 62.

The hammer mechanism 40 causes the output part 8 to hammer in the axial direction. The hammer mechanism 40 comprises a first cam 41, a second cam 42, and a hammer-changing ring 43.

The output part 8 (output shaft) is disposed more forward than the motor 6. The output part 8 rotates in response to application of the rotational force of the motor 6. The output part 8 rotates, in the state in which the tool accessory has been mounted, due to the rotational force transmitted from the motor 6 via the power-transmission mechanism 7. The output part 8 is disposed forward of the speed-reducing mechanism 30, which comprises the first planetary-gear mechanism 31, the second planetary-gear mechanism 32, and the third planetary-gear mechanism 33, and is rotated by the speed-reducing mechanism 30. The output part 8 comprises: a spindle 81, which rotates about rotational axis AX due to the rotational force transmitted from the motor 6; and a chuck 82, in which a tool accessory (e.g., a tool bit) is mountable.

The fan 9 is disposed rearward of the motor 6. The fan 9 generates an airflow for cooling the motor 6. The fan 9 is fixed to at least a portion of the rotor 62. The fan 9 is fixed to a rear portion of the rotor shaft 63. The fan 9 is rotated by rotating the rotor shaft 63. By rotating of the rotor shaft 63, the fan 9 rotates together with the rotor shaft 63. By the rotating of the fan 9, air surrounding the housing 2 flows into the interior space of the housing 2 via the air-intake ports 19A. The air that has flowed into the interior space of the housing 2 flows through the interior space of the housing 2, and thereby cools the motor 6. The air that has flowed through the interior space of the housing 2 flows out to the exterior of the housing 2 via the air-exhaust ports 19B.

The trigger lever 10 is manipulated (manually operated, e.g., pulled or squeezed) to start the motor 6. The trigger lever 10 is provided at an upper portion of the grip part 22. A front-end portion of the trigger lever 10 protrudes forward from a front portion of the grip part 22. The trigger lever 10 is movable in the front-rear direction. The trigger lever 10 is configured to be manipulated by the user. When the trigger lever 10 is moved rearward, a trigger signal is generated in a trigger-signal generating circuit 17, which starts the motor 6. By releasing the trigger lever 10, the motor 6 stops.

The forward/reverse-change lever 11 is manipulated (manually shifted) to change the rotational direction of the motor 6. The forward/reverse-change lever 11 is provided at an upper portion of the grip part 22. A left-end portion of the forward/reverse-change lever 11 protrudes leftward from a left portion of the grip part 22. A right-end portion of the forward/reverse-change lever 11 protrudes rightward from a right portion of the grip part 22. The forward/reverse-change lever 11 is movable in the left-right direction. The forward/reverse-change lever 11 is configured to be manipulated by the user. By manipulating (manually shifting) the forward/reverse-change lever 11 such that it moves leftward, the motor 6 rotates in the forward-rotational direction. By manipulating (manually shifting) the forward/reverse-change lever 11 such that it moves rightward, the motor 6 rotates in the reverse-rotational direction. By changing the rotational direction of the motor 6, the rotational direction of the spindle 81 changes.

The speed-changing lever 12 is manipulated (manually shifted) to change the speed mode of the speed-reducing mechanism 30. The speed-changing lever 12 is provided at an upper portion of the motor-housing part 21. The speed-changing lever 12 is movable in the front-rear direction. The speed-changing lever 12 is configured to be manipulated by the user. The speed modes of the speed-reducing mechanism 30 include a low-speed mode and a high-speed mode. The low-speed mode refers to a speed mode in which the output part 8 is rotated at low speed (i.e. within a low speed range). The high-speed mode refers to a speed mode in which the output part 8 is rotated at high speed (i.e. within a high speed range that is higher than the low speed range). By manipulating (manually shifting) the speed-changing lever 12 such that it moves forward, the speed mode of the speed-reducing mechanism 30 is set to the low-speed mode. By manipulating (manually shifting) the speed-changing lever 12 such that it moves rearward, the speed mode of the speed-reducing mechanism 30 is set to the high-speed mode.

The mode-changing ring (action mode change ring) 13 is manipulated (manually rotated) to change the action mode of the hammer mechanism 40. The mode-changing ring 13 is disposed forward of the casing 4. The mode-changing ring 13 is rotatable. The mode-changing ring 13 is configured to be manipulated by the user. A mode-detection ring 49 rotates integrally with the mode-changing ring 13. The mode-detection ring 49 is disposed in the interior of the mode-changing ring 13. A permanent magnet 49M is provided on the mode-detection ring 49. The action modes of the hammer mechanism 40 include a hammer mode and a non-hammer mode. The hammer mode refers to an action mode in which the output part 8 is caused to hammer in the axial direction. The non-hammer mode refers to an action mode in which the output part 8 is not caused to hammer in the axial direction. By manipulating (manually rotating) the mode-changing ring 13 such that it is disposed at a hammer-mode position in the rotational direction, the action mode of the hammer mechanism 40 is set to the hammer mode. By manipulating (manually rotating) the mode-changing ring 13 such that it is disposed at a non-hammer-mode position in the rotational direction, the action mode of the hammer mechanism 40 is set to the non-hammer mode.

The light unit 14 emits illumination light that illuminates forward of the driver-drill 1. The light unit 14 comprises, for example, one or more light-emitting diodes (LED(s)). The light unit 14 and the light-holding part 24, which holds the light unit 14, are provided at a front portion of the battery-holding part 23. The light unit 14 may be regarded as being disposed on or in the battery-holding part 23. The light unit 14 is disposed at the front portion of the battery-holding part 23.

A light opening (aperture) 29 is provided in the light-holding part 24. The light opening 29 is formed in a front surface of the light-holding part 24 (the battery-holding part 23). At least a portion of the light unit 14 is disposed in the light opening 29.

The (user) interface panel 15 is provided on the battery-holding part 23. The interface panel 15 comprises a manipulation apparatus (e.g., a switch) 25A and a display apparatus (display) 25B. The interface panel 15 has a sheet or plate shape. The manipulation apparatus 25A comprises a manipulatable button. Illustrative examples of the display apparatus 25B are: a segmented-display device, which comprises a plurality of segmented, light-emitting devices; a flat-panel display, such as a liquid-crystal display; and an indicator-type display device, on which a plurality of light-emitting diodes is disposed.

A panel opening 27 is formed in the battery-holding part 23. The panel opening 27 is formed in an upper surface of the battery-holding part 23 more forward than the grip part 22. At least a portion of the interface panel 15 is disposed in the panel opening 27.

The manipulation apparatus 25A is manipulated (manually pressed) to change the drive mode of the motor 6. The manipulation apparatus 25A is manipulated by the user. The drive modes of the motor 6 include a drill mode and a clutch mode (also known as a screwdriving mode). The drill mode refers to a drive mode in which, during the drive of the motor 6, the motor 6 is driven regardless of the torque that acts on the motor 6. The clutch mode (screwdriving mode) refers to a drive mode in which, during the drive of the motor 6, the motor 6 is stopped when the torque that acts on the motor 6 is detected as meeting or exceeding a pre-set torque threshold.

The dial 16 is manipulated (manually rotated) to change the drive conditions of the motor 6. The dial 16 is disposed at a right portion of a front portion of the battery-holding part 23. The dial 16 is rotatable about a dial axis, which extends in the left-right direction. The dial 16 is rotatable over 360° or more; i.e. the dial 16 may be configured to be endlessly rotatable. The dial 16 is configured to be manipulated by the user. A representative, non-limiting drive condition of the motor 6 is the torque threshold. That is, the dial 16 can be manipulated (manually rotated) to change the (pre-set) torque threshold in the clutch mode that is set by the manipulation apparatus 25A.

A dial opening 28 is formed in the battery-holding part 23. The dial opening 28 is formed in a front portion of the battery-holding part 23. At least a portion of the dial 16 is disposed in the dial opening 28.

The controller 18 comprises a computer system. The controller 18 outputs control instructions (e.g., motor drive signals) to control (drive) the motor 6. At least a portion of the controller 18 is housed in a controller case 26. In the state in which the controller 18 is held by the controller case 26, the controller 18 is housed in the battery-holding part 23. The controller 18 comprises a controller board (e.g., a circuit board) 18A, on which a plurality of electronic parts is mounted. Illustrative examples of the electronic parts mounted on the controller board 18A include: a processor, such as a CPU (central-processing unit); nonvolatile memory, such as ROM (read-only memory) and storage; volatile memory, such as RAM (random-access memory); transistors (e.g., power FETs); capacitors; and resistors.

The controller 18 sets the drive conditions of the motor 6 based on the manipulation (e.g., rotational position) of the dial 16. As described above, the drive conditions of the motor 6 include the torque threshold. In the clutch mode, the controller 18 sets the torque threshold based on the manipulation (e.g., the rotational position) of the dial 16.

In addition, in the clutch mode, the controller 18 stops the motor 6 when the torque that acts on the motor 6 during the drive of the motor 6 exceeds the torque threshold, which was pre-set as described above.

In addition, the controller 18 displays the set drive condition of the motor 6 on the display apparatus 25B. The controller 18 displays the set torque threshold on the display apparatus 25B.

Motor and Power-Transmission Mechanism

Figure 4:
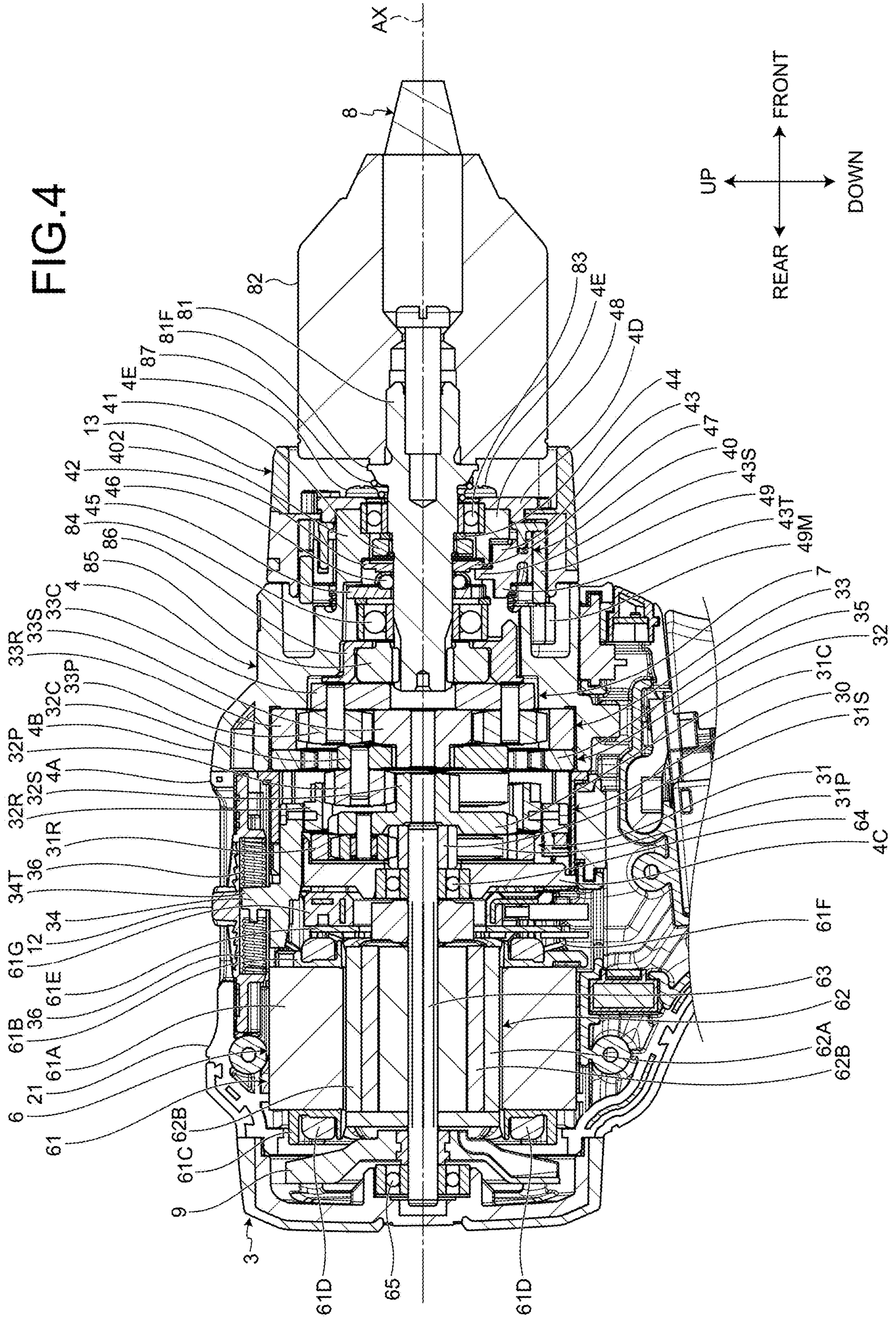
FIG. 4 is a cross-sectional view that shows an upper portion of the driver-drill according to the embodiment.

FIG. 4 is a cross-sectional view that shows an upper portion of the driver-drill 1 according to the embodiment. As shown in FIG. 4, the motor 6 comprises: the stator 61, which has a tubular shape; and the rotor 62, which is disposed in the interior of the stator 61. The rotor 62 comprises the rotor shaft 63, which extends in the axial direction.

The stator 61 comprises: a stator core 61A, which comprises a plurality of stacked steel sheets; a front insulator 61B, which is disposed at a front portion of the stator core 61A; a rear insulator 61C, which is disposed at a rear portion of the stator core 61A; a plurality of coils 61D, which is wound around the stator core 61A via the front insulator 61B and the rear insulator 61C; a sensor circuit board 61E, which is mounted on the front insulator 61B; fusing terminals 61F, which are respectively connected to the coils 61D (e.g., each fusing terminal 61F is electrically connected to a pair of coils 61D); and a short-circuiting member (e.g., multiple bus bars that are embedded in an electrically-insulating polymer) 61G, which is supported on the front insulator 61B. The sensor circuit board 61E comprises a plurality of rotation-detection devices, which detects the rotation of the rotor 62. The short-circuiting member 61G electrically connects the plurality of coils 61D via the fusing terminals 61F. The short-circuiting member 61G is electrically connected to the controller 18 via lead lines.

The rotor 62 rotates around rotational axis AX. The rotor 62 comprises: the rotor shaft 63; a rotor core 62A, which is disposed around the rotor shaft 63; and a plurality of permanent magnets 62B, which is held in the rotor core 62A. The rotor core 62A has a circular-tube shape. The rotor core 62A comprises a plurality of stacked steel sheets. The rotor core 62A has through holes, which each extend (in parallel) in the axial direction. More specifically, a plurality of the through holes is formed in the circumferential direction. The permanent magnets 62B are respectively disposed in the plurality of through holes of the rotor core 62A.

The rotation-detection devices of the sensor circuit board 61E detect the rotation of the rotor 62 by detecting the magnetic fields of the permanent magnets 62B. The controller 18 supplies drive currents to the respective coils 61D based on the detection data from the rotation-detection devices.

The rotor shaft 63 rotates around rotational axis AX. Rotational axis AX of the rotor shaft 63 coincides with the rotational axis of the output part 8. A front portion of the rotor shaft 63 is supported by a bearing 64 in a rotatable manner. A rear portion of the rotor shaft 63 is supported by a bearing 65 in a rotatable manner. The bearing 64 is held by the bracket plate 4C, which is disposed forward of the stator 61. The bearing 65 is held by the rear cover 3. A front-end portion of the rotor shaft 63 is disposed more forward than the bearing 64. A front-end portion of the rotor shaft 63 is disposed in the interior space of the casing 4.

A pinion gear 31S is provided at a front-end portion of the rotor shaft 63. The rotor shaft 63 is coupled to the first planetary-gear mechanism 31 of the speed-reducing mechanism 30 via the pinion gear 31S.

The first planetary-gear mechanism 31 comprises: a plurality of planet gears 31P, which is disposed around the pinion gear 31S; a first carrier 31C, which supports the plurality of planet gears 31P; and an internal gear 31R, which is disposed around the plurality of planet gears 31P. Gears are provided at an outer-circumferential portion of the first carrier 31C.

The second planetary-gear mechanism 32 comprises: a sun gear 32S; a plurality of planet gears 32P, which is disposed around the sun gear 32S; a second carrier 32C, which supports the plurality of planet gears 32P; and an internal gear 32R, which is disposed around the plurality of planet gears 32P. The sun gear 32S is disposed forward of the first carrier 31C. The diameter of the sun gear 32S is smaller than the diameter of the first carrier 31C. The first carrier 31C and the sun gear 32S are integral. The first carrier 31C and the sun gear 32S rotate together.

The third planetary-gear mechanism 33 comprises: a sun gear 33S; a plurality of planet gears 33P, which is disposed around the sun gear 33S; a third carrier 33C, which supports the plurality of planet gears 33P; and an internal gear 33R, which is disposed around the plurality of planet gears 33P. The sun gear 33S is disposed forward of the second carrier 32C.

In addition, the speed-reducing mechanism 30 comprises: a speed-changing ring 34, which is coupled to the speed-changing lever 12; and a coupling ring 35, which is disposed forward of the speed-changing ring 34. The coupling ring 35 is fixed to an inner surface of the first casing 4A. Gears are provided at an inner-circumferential portion of the coupling ring 35. The speed-changing ring 34 has a protruding part 34T, which protrudes upward. Coil springs 36 are respectively disposed forward and rearward of the protruding part 34T. The speed-changing ring 34 is coupled to the speed-changing lever 12 via the coil springs 36.

The speed-changing ring 34 is configured to change (switch) between the low-speed mode and the high-speed mode. The speed-changing ring 34 is operably coupled to the internal gear 32R. The speed-changing lever 12 is operably coupled to the internal gear 32R via the speed-changing ring 34. The speed-changing lever 12, the speed-changing ring 34, and the internal gear 32R are movable integrally. When the user manipulates (shifts) the speed-changing lever 12, the speed-changing ring 34 moves in the front-rear direction on the inner side of the first casing 4A. The speed-changing ring 34 changes between the low-speed mode and the high-speed mode by moving in the front-rear direction between the low-speed-mode position and the high-speed-mode position, which is more rearward than the low-speed-mode position, in the state in which the internal gear 32R and the planet gears 32P are meshed. By manipulating the speed-changing lever 12, it is changed between the low-speed mode and the high-speed mode.

In the state in which the internal gear 32R is disposed at the low-speed-mode position, the internal gear 32R makes contact with the coupling ring 35. Owing to the internal gear 32R making contact with the coupling ring 35, rotation of the internal gear 32R is restricted (blocked). In the state in which the internal gear 32R is disposed at the high-speed-mode position, the internal gear 32R is spaced apart from the coupling ring 35. Owing to the internal gear 32R being spaced apart from the coupling ring 35, rotation of the internal gear 32R is permitted.

In addition, in the state in which the internal gear 32R is disposed at the low-speed-mode position, the internal gear 32R meshes with the planet gears 32P. In the state in which the internal gear 32R is disposed at the high-speed-mode position, the internal gear 32R meshes with both the planet gears 32P and the first carrier 31C.

In the state in which the internal gear 32R is disposed at the low-speed-mode position, when the rotor shaft 63 rotates due to the driving of the motor 6, the pinion gear 31S rotates, and the planet gears 31P revolve around the pinion gear 31S. Owing to the revolving of the planet gears 31P, the first carrier 31C and the sun gear 32S rotate at a rotational speed that is lower than the rotational speed of the rotor shaft 63. When the sun gear 32S rotates, the planet gears 32P revolve around the sun gear 32S. Owing to the revolving of the planet gears 32P, the second carrier 32C and the sun gear 33S rotate at a rotational speed that is lower than the rotational speed of the first carrier 31C. Thus, in the state in which the internal gear 32R is disposed at the low-speed-mode position, when the motor 6 is driven, both the speed-reducing function of the first planetary-gear mechanism 31 and the speed-reducing function of the second planetary-gear mechanism 32 are utilized, and the second carrier 32C and the sun gear 33S rotate in the low-speed mode.

In the state in which the internal gear 32R is disposed at the high-speed-mode position, when the rotor shaft 63 rotates due to the driving of the motor 6, the pinion gear 31S rotates, and the planet gears 31P revolve around the pinion gear 31S. Owing to the revolving of the planet gears 31P, the first carrier 31C and the sun gear 32S rotate at a rotational speed that is lower than the rotational speed of the rotor shaft 63. In the state in which the internal gear 32R is disposed at the high-speed-mode position, because the internal gear 32R meshes with both the planet gears 32P and the first carrier 31C, the internal gear 32R and the first carrier 31C rotate together. Owing to the rotating of the internal gear 32R, the planet gears 32P revolve at a revolving speed that is the same as the rotational speed of the internal gear 32R. Owing to the revolving of the planet gears 32P, the second carrier 32C and the sun gear 33S rotate at a rotational speed that is the same as the rotational speed of the first carrier 31C. Thus, when the motor 6 is driven in the state in which the internal gear 32R is disposed at the high-speed-mode position, although the speed-reducing function of the first planetary-gear mechanism 31 is utilized, the speed-reducing function of the second planetary-gear mechanism 32 is not utilized, and therefore the second carrier 32C and the sun gear 33S rotate in the high-speed mode.

When the second carrier 32C and the sun gear 33S rotate, the planet gears 33P revolve around the sun gear 33S. Owing to the revolving of the planet gears 33P, the third carrier 33C rotates.

The spindle 81 is operably coupled to the third carrier 33C via a lock cam 85. The spindle 81 is spline-coupled to the lock cam 85. The lock cam 85 is supported by a lock ring 86 in a rotatable manner. The lock ring 86 is disposed in the interior of the second casing 4B. The lock ring 86 is fixed to the second casing 4B. When the third carrier 33C rotates, the spindle 81 also rotates.

The spindle 81 is supported by a bearing 83 and a bearing 84 in a rotatable manner. In the state in which the spindle 81 is supported by the bearing 83 and the bearing 84, the spindle 81 is movable in the front-rear direction.

The spindle 81 has a flange portion 81F. A coil spring 87 is disposed between the flange portion 81F and the bearing 83. The coil spring 87 generates an elastic force that moves (urges, biases) the spindle 81 forward.

The chuck 82 is configured to hold the tool accessory. The chuck 82 is coupled (affixed) to a front portion of the spindle 81. When the spindle 81 rotates, the chuck 82 also rotates. The chuck 82 rotates in the state in which the chuck 82 holds the tool accessory.

The first cam 41 and the second cam 42 of the hammer mechanism 40 are both disposed in the interior of the second casing 4B. In the front-rear direction, both the first cam 41 and the second cam 42 are disposed between the bearing 83 and the bearing 84.

The first cam 41 has a ring shape. The first cam 41 is disposed around the spindle 81. The first cam 41 is fixed to the spindle 81. The first cam 41 rotates together with the spindle 81. A cam gear is provided on a rear surface of the first cam 41. The first cam 41 is supported by a stop ring 44. The stop ring 44 is disposed around the spindle 81. In the front-rear direction, the stop ring 44 is disposed between the first cam 41 and the bearing 83. Owing to the elastic force of the coil spring 87, the stop ring 44 is urged to make contact with a rear surface of the bearing 83.

The second cam 42 has a ring shape. The second cam 42 is disposed rearward of the first cam 41. The second cam 42 is disposed around the spindle 81. The second cam 42 is rotatable relative to the spindle 81. A cam gear is provided on a front surface of the second cam 42. The cam gear on the front surface of the second cam 42 meshes with the cam gear on the rear surface of the first cam 41. A tab is provided on a rear surface of the second cam 42.

In the front-rear direction, a support ring 45 is disposed between the second cam 42 and the bearing 84. The support ring 45 is disposed on the inner side of the second casing 4B. The support ring 45 is fixed to the second casing 4B. A plurality of steel balls 46 is disposed on a front surface of the support ring 45. A washer 47 is disposed between the steel balls 46 and the second cam 42. The second cam 42 is rotatable in the state in which forward-rearward movement is restricted in the space that is defined by a small-diameter portion 402 and the washer 47.

The hammer-changing ring 43 is configured to change (switch) between the hammer mode and the non-hammer mode. The mode-changing ring 13 is coupled to the hammer-changing ring 43 via a cam ring 48. The mode-changing ring 13 and the cam ring 48 are integrally rotatable. The hammer-changing ring 43 is movable in the front-rear direction. The hammer-changing ring 43 has a projection portion 43T. The projection portion 43T is inserted into a guide hole, which is provided in the second casing 4B. The hammer-changing ring 43 is movable in the front-rear direction while being guided by the guide hole provided in the second casing 4B. Rotation of the hammer-changing ring 43 is restricted (blocked) by the projection portion 43T. When the user manipulates (rotates) the mode-changing ring 13, the hammer-changing ring 43 moves in the front-rear direction. By moving the hammer-changing ring 43 in the front-rear direction between an advanced position and a retracted position, which is more rearward than the advanced position, it changes between the hammer mode and the non-hammer mode. Thus, by manipulating the mode-changing ring 13, it changes between the hammer mode and the non-hammer mode.

The hammer mode includes the state in which rotation of the second cam 42 is restricted (blocked). The non-hammer mode includes the state in which rotation of the second cam 42 is permitted. When the hammer-changing ring 43 moves to the advanced position, rotation of the second cam 42 is restricted (blocked). When the hammer-changing ring 43 moves to the retracted position, rotation of the second cam 42 is permitted.

In the hammer mode, at least a portion of the hammer-changing ring 43, which has moved to the advanced position, makes contact with the second cam 42. When the hammer-changing ring 43 and the second cam 42 make contact with each other, rotation of the second cam 42 is restricted (blocked). In the state in which rotation of the second cam 42 is restricted (blocked), when the motor 6 is driven, the first cam 41, which is fixed to the spindle 81, rotates while making contact with the cam gear of the second cam 42. Thereby, the spindle 81 rotates while hammering in the front-rear (axial) direction.

In the non-hammer mode, the hammer-changing ring 43, which has moved to the retracted position, is spaced apart from the second cam 42. Owing to the hammer-changing ring 43 being spaced apart from the second cam 42, rotation of the second cam 42 is permitted. In the state in which rotation of the second cam 42 is permitted, when the motor 6 is driven, the second cam 42 rotates together with the first cam 41 and the spindle 81. Thereby, the spindle 81 rotates without hammering in the front-rear direction.

The hammer-changing ring 43 is disposed around the first cam 41 and the second cam 42. In addition, the hammer-changing ring 43 comprises an opposing portion 43S, which opposes a rear surface of the second cam 42. The opposing portion 43S protrudes radially inward from a rear portion of the hammer-changing ring 43.

When the mode-changing ring 13 is manipulated (rotated) and the hammer-changing ring 43 moves to the advanced position, the tab on the rear surface of the second cam 42 make contact with the opposing portion 43S of the hammer-changing ring 43. Thereby, rotation of the second cam 42 is restricted (blocked). Thus, owing to the mode-changing ring 13 being manipulated and the hammer-changing ring 43 moving to the advanced position, the hammer mechanism 40 changes to the hammer mode.

When the mode-changing ring 13 is manipulated (rotated) and the hammer-changing ring 43 moves to the retracted position, the opposing portion 43S of the hammer-changing ring 43 is spaced apart from the second cam 42. Thereby, rotation of the second cam 42 is permitted. Thus, owing to the mode-changing ring 13 being manipulated and the hammer-changing ring 43 moving to the retracted position, the hammer mechanism 40 changes to the non-hammer mode.

Light Unit

Figure 5:
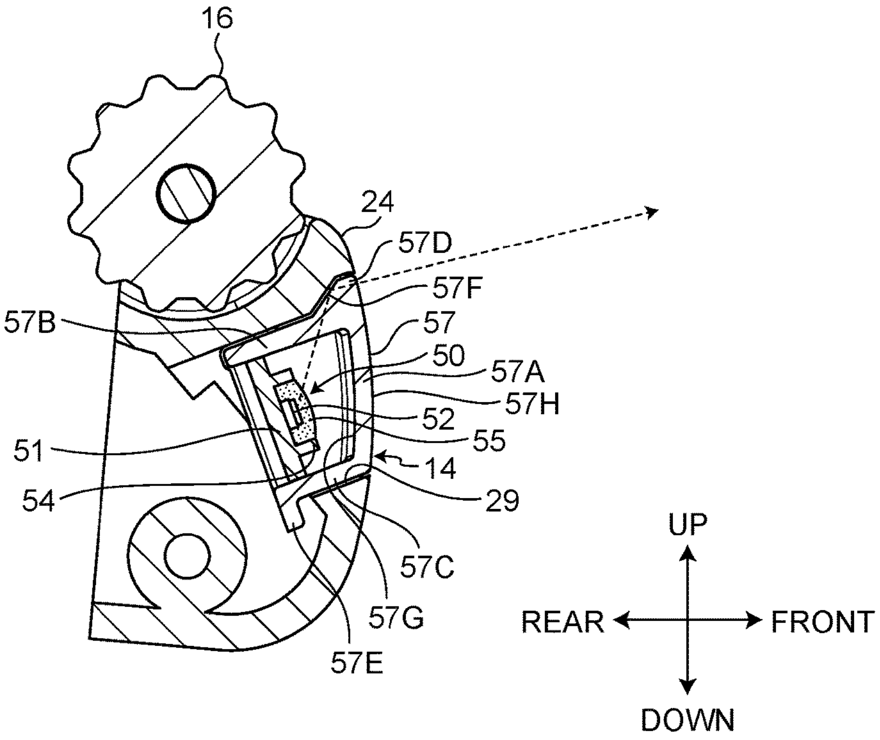
FIG. 5 is a cross-sectional view that shows a light unit according to the embodiment.
Figure 6:
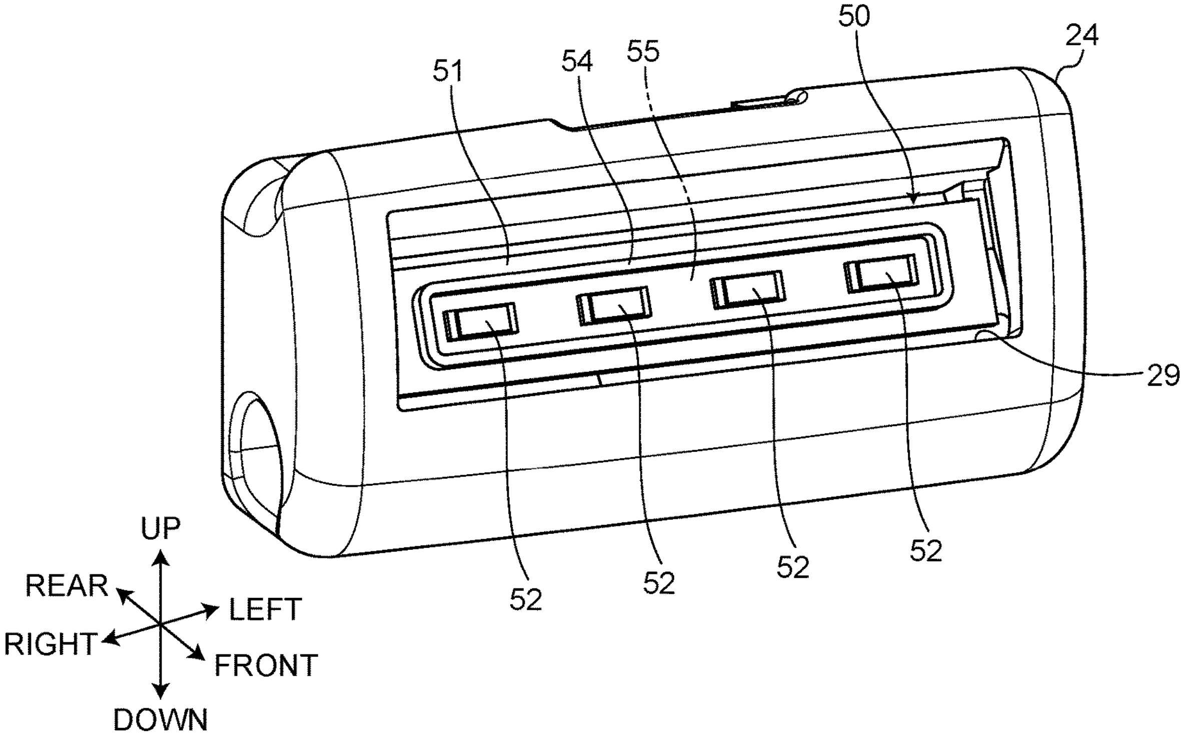
FIG. 6 is an oblique view that shows the light unit according to the embodiment.

FIG. 5 is a cross-sectional view that shows the light unit 14 according to the present embodiment. FIG. 6 is an oblique view that shows the light unit 14 according to the present embodiment.

The light unit 14 emits illumination light. The light unit 14 illuminates the tip and the periphery of the bit (tool accessory) mounted on or in the output part 8 with illumination light. The light unit 14 also illuminates the front-end side of the output part 8 with illumination light. In addition, the light unit 14 illuminates the work object (workpiece) that is being processed with the driver-drill 1 with illumination light.

The light unit 14 is disposed at a front portion of the battery-holding part 23. In the present embodiment, the light-holding part 24, which holds the light unit 14, is disposed at the front portion of the battery-holding part 23.

The light unit 14 comprises a chip-on-board light-emitting diode 50 (COB LED) and an optical member 57. In the present embodiments, the chip-on-board light-emitting diode 50 is called a COB light 50 as appropriate.

The COB light 50 comprises a board (e.g., a circuit board) 51, a plurality of LED devices 52, which are light-emitting devices, a bank 54, and a fluorescent body 55. An aluminum board, a fiberglass-base-material epoxy-resin board (FR-4 board), and a composite-base-material epoxy-resin board (CEM-3 board) are illustrative examples of the board 51. The LED devices 52 and the board 51 are electrically connected via gold wires (not shown). The gold wires electrically connect the plurality of LED devices 52 to each other. The bank 54 is provided on a surface of the board 51. The bank 54 is disposed around the LED devices 52. The bank 54 defines a partition space, in which the fluorescent body 55 is disposed. A pair of electrodes (not shown) is disposed on a surface (front surface) of the board 51 outward of the bank 54. It is noted that the electrodes may instead be disposed on a back surface (rear surface) of the board 51. The pair of electrodes includes a positive electrode and a negative electrode. Electric power output from the battery 20 is supplied to the electrodes. Electric power supplied to the electrodes is supplied to the LED devices 52 via the board 51 and the gold wires. Thus, the LED devices 52 emit light using electric power supplied from the battery 20.

The board 51 has an oblong shape that is elongate in the left-right direction. The LED devices 52 are installed on a surface (front surface) of the board 51. The LED devices 52 are disposed spaced apart in the left-right direction. In the present embodiment, four of the LED devices 52 are disposed equispaced in the left-right direction.

The bank 54 is provided on the front surface of the board 51. The bank 54 protrudes forward from the front surface of the board 51. The bank 54 has a ring (endless) shape, which is rectangular with rounded corners in the present embodiment. The plurality of LED devices 52 is disposed in the interior of the bank 54.

The fluorescent body 55 is disposed on the front surface of the board 51. The fluorescent body 55 is disposed so as to cover the plurality of LED devices 52 in the interior of the bank 54.

A pair of lead lines, which is not shown, is connected to the board 51. The electrodes described above are electrically connected to the lead lines. Electric current output from the battery 20 is supplied to the electrodes via the controller 18 and the lead lines. The voltage of the battery 20 is applied to the electrodes. The electric current supplied to the electrodes is supplied to the LED devices 52 via the board 51 and the gold wires. The LED devices 52 emit light using electric current supplied from the battery 20.

The optical member 57 is connected to the COB light 50. The optical member 57 is fixed to the board 51. The optical member 57 is preferably made of polycarbonate resin or another similar hard, durable polymer. In the present embodiment, the optical member 57 is made of a polycarbonate resin that contains a white diffusing agent. Therefore, the optical member 57 has a milky-white color. The light transmittance of the optical member 57 is 40% or more and 70% or less. Because the optical member 57 has a milky-white color, the outer shape of the LED devices 52 is difficult to visually perceive from outside of the driver-drill 1. Because the outer shape of the LED devices 52 is difficult to visually perceive due to the partial opaqueness of the optical member 57, the design aesthetics of the driver-drill 1 are improved.

At least a portion of the optical member 57 is disposed more forward than the COB light 50. It is disposed in the light opening 29, which is provided in the light-holding part 24. As described above, if the light-holding part 24 and the battery-holding part 23 are regarded as one body, the optical member 57 is disposed in the light opening 29 provided in the battery-holding part 23. The optical member 57 comprises a light-transmitting part 57A, an upper-side enclosing part 57B, a lower-side enclosing part 57C, an upper-side protruding part 57D, and a lower-side protruding part 57E.

The light-transmitting part 57A is disposed more forward than the COB light 50. Light emitted from the COB light 50 transmits through (transits) the light-transmitting part 57A. The light-transmitting part 57A is disposed more forward than the LED devices 52. The light-transmitting part 57A opposes the LED devices 52. Light emitted from the LED devices 52 passes through the light-transmitting part 57A and is radiated forward of the light unit 14.

The light-transmitting part 57A has: an incident surface 57G, on which light from the LED devices 52 of the COB light 50 impinges; and an emergent surface 57H, from which light from the incident surface 57G emerges. The front surface of the board 51 opposes the incident surface 57G of the light-transmitting part 57A. The incident surface 57G opposes the LED devices 52. The incident surface 57G faces substantially rearward. The emergent surface 57H faces substantially forward.

The upper-side enclosing part 57B extends rearward from an upper-end portion of the light-transmitting part 57A. The upper-side protruding part 57D protrudes upward from a front portion of the upper-side enclosing part 57B. The lower-side enclosing part 57C extends rearward from a lower-end portion of the light-transmitting part 57A. The lower-side protruding part 57E protrudes downward from a rear portion of the lower-side enclosing part 57C.

A fully reflecting surface 57F is disposed on the upper-side protruding part 57D. The fully reflecting surface 57F is disposed more upward than the incident surface 57G. The fully reflecting surface 57F causes the light from the LED devices 52 of the COB light 50 to totally reflect forward. The light from the incident surface 57G and the light from the fully reflecting surface 57F emerges from the emergent surface 57H. The fully reflecting surface preferably reflects at least 90% of light that impinges on it, more preferably at least 95%.

The board 51 is held by the light-holding part 24 via the optical member 57. The board 51 is held by the light-holding part 24 in the state in which the board 51 is tilted relative to rotational axis AX of the motor 6. An angle formed between rotational axis AX of the motor 6 and a normal line to the front surface of the board 51 is preferably 5° or more and 20° or less. In the present embodiment, the angle formed between rotational axis AX of the motor 6 and a normal line to the front surface of the board 51 is 10°.

Controller

Figure 7:
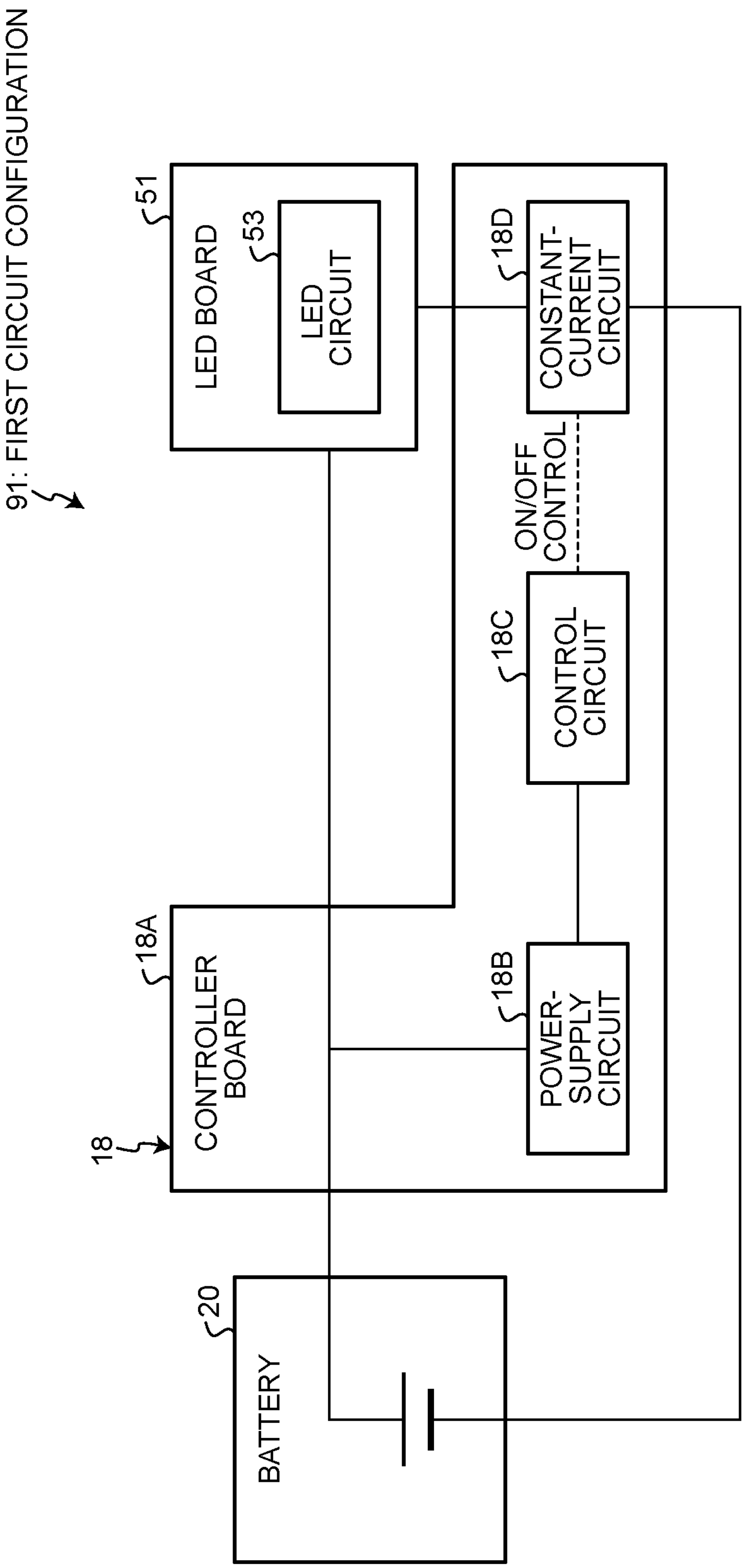
FIG. 7 is a block diagram that shows the driver-drill according to the embodiment.
Figure 8:
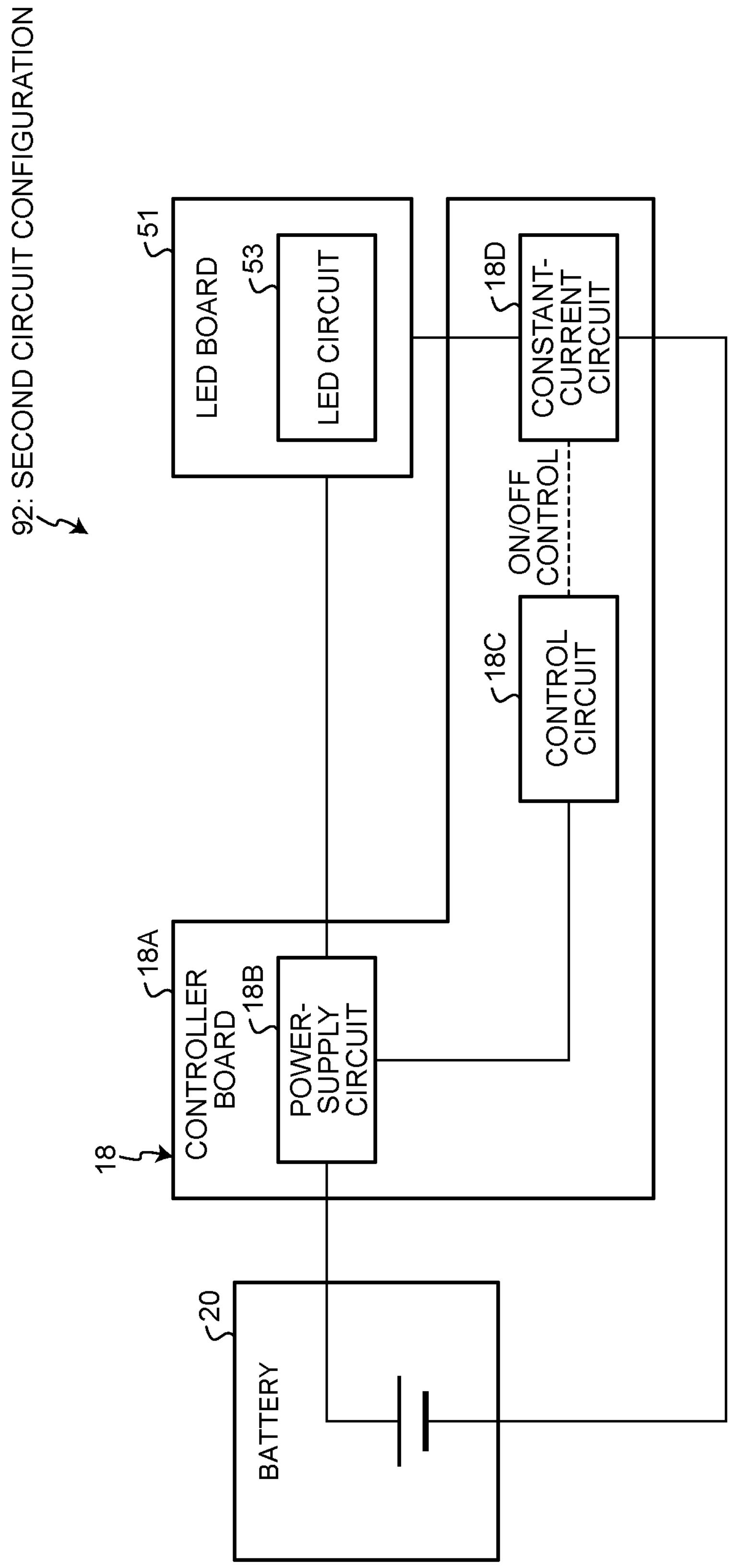
FIG. 8 is a block diagram that shows the driver-drill according to the embodiment.

FIG. 7 and FIG. 8 are block circuit diagrams of two embodiments of the driver-drill 1 according to the present teachings. FIG. 7 shows a first circuit configuration 91 of the driver-drill 1. FIG. 8 shows a second circuit configuration 92 of the driver-drill 1. As shown in both FIG. 7 and FIG. 8, the driver-drill 1 comprises the battery 20, the controller board 18A, and the board 51 (LED board). A power-supply circuit 18B, a control circuit 18C, and a constant-current circuit 18D are provided on the board 51. An LED circuit 53 is also provided on the board 51.

The power-supply circuit 18B adjusts the voltage supplied from the battery 20 to at least the control circuit 18C. In the first circuit configuration 91, which is shown in FIG. 7, the power-supply circuit 18B does not exist between the battery 20 and the LED circuit 53. In the first circuit configuration 91, the voltage of the battery 20 is supplied to the control circuit 18C in the state in which the voltage has been stepped down by the power-supply circuit 18B to, for example, 5 V. In the first circuit configuration 91, the voltage of the battery 20 is supplied to the COB light 50 via the LED circuit 53 without being stepped down. In the second circuit configuration 92 shown in FIG. 8, the voltage of the battery 20 is applied to both the control circuit 18C and the LED circuit 53 in the state in which the voltage has been stepped down by the power-supply circuit 18B to, for example, 5 V. In the above-described embodiment, either the first circuit configuration 91 or the second circuit configuration 92 can be used as the circuit configuration of the driver-drill 1.

The control circuit 18C controls the ON/OFF state of the COB light 50. That is, the control circuit 18C turns the LED devices 52 ON and OFF. The constant-current circuit 18D controls the electric current supplied to the LED circuit 53.

Figure 9:
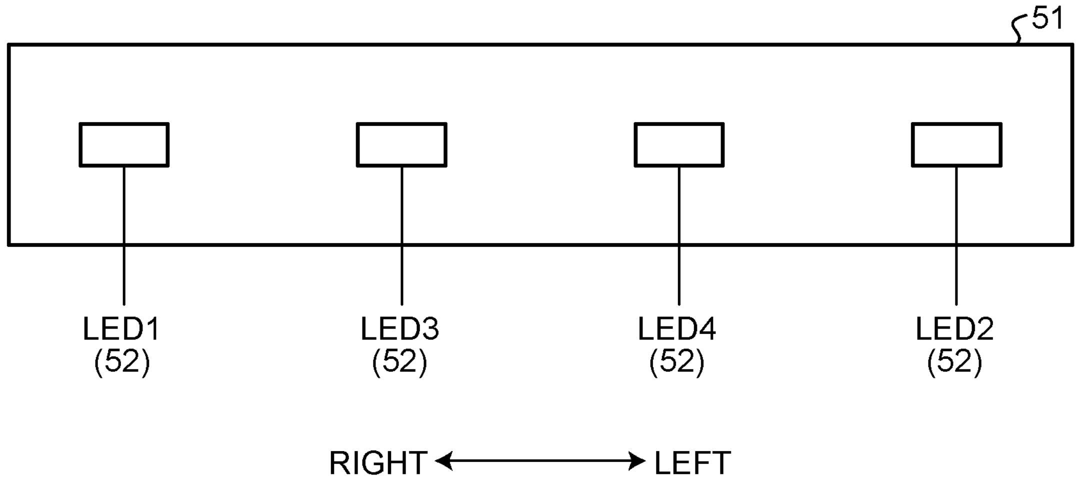
FIG. 9 shows LED devices, which are installed on a board, according to the embodiment.

FIG. 9 shows the LED devices 52, which are installed on the board 51, according to the present embodiment. The board 51 is elongate in the left-right direction. Four of the LED devices 52 are installed on the front surface of the board 51 spaced apart in the left-right direction; in the explanation below, among the four LED devices 52, the LED device 52 disposed most on the right side is called LED1 as appropriate, the LED device 52 disposed on the right side following LED1 is called LED3 as appropriate, the LED device 52 disposed on the right side following LED3 is called LED4 as appropriate, and the LED device 52 disposed most on the left side is called LED2 as appropriate.

Figure 10:
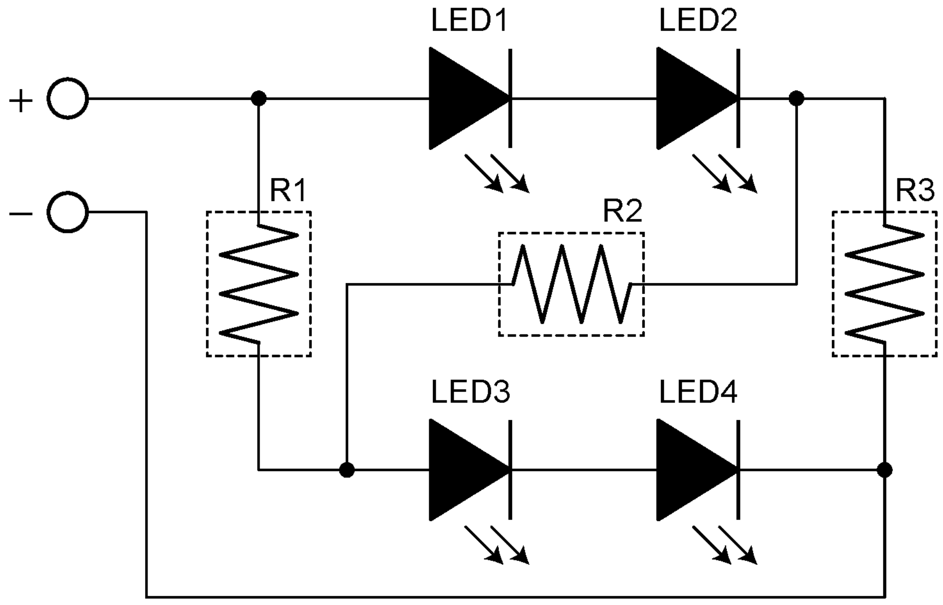
FIG. 10 shows an overall circuit configuration of an LED circuit, in which there are four LED devices, according to an embodiment.

FIG. 10 shows an overall circuit configuration of the LED circuit 53, in an embodiment in which there are four of the LED devices 52, according to the embodiment. LED1, LED2, LED3, and LED4 are installed on the board 51. Resistor R1, resistor R2, and resistor R3 can be installed on the board 51.

Figure 11:
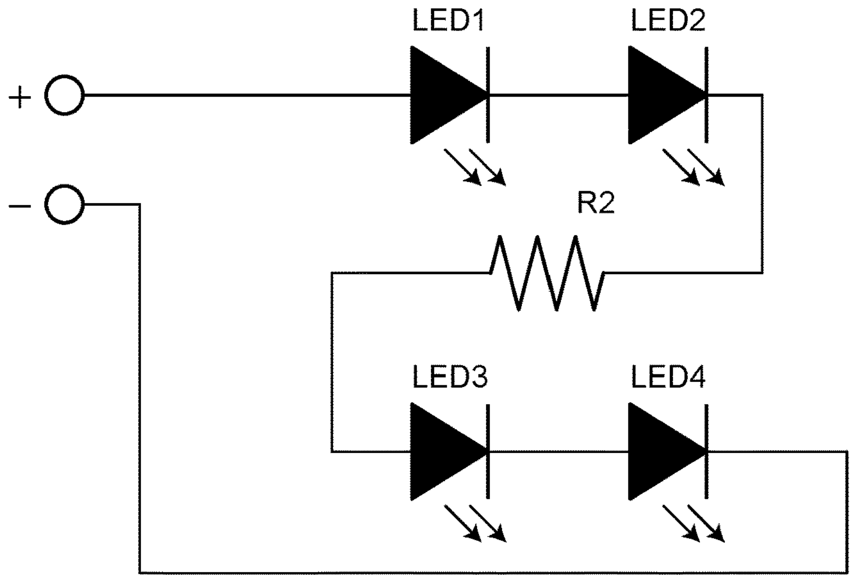
FIG. 11 shows a circuit configuration of an LED circuit, in which there are four LED devices, according to an embodiment.
Figure 12:
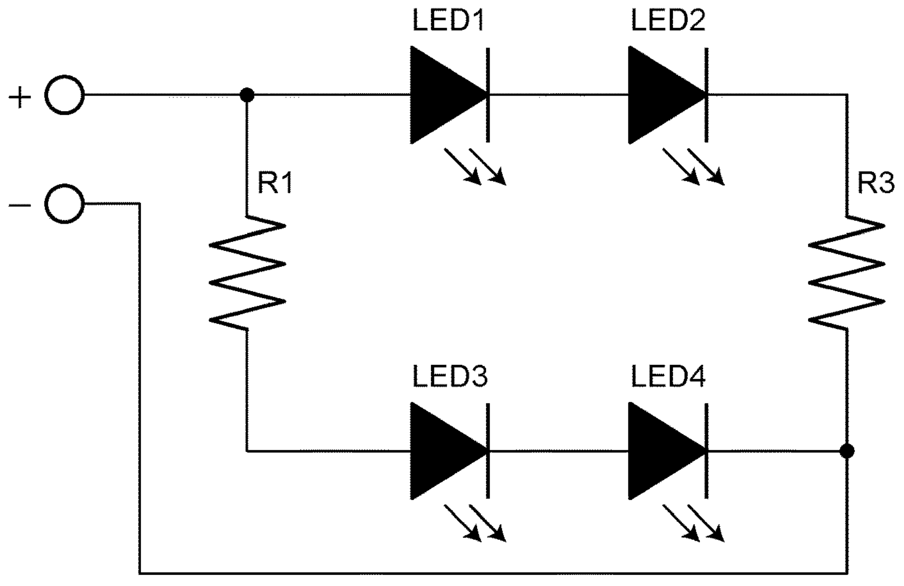
FIG. 12 shows a circuit configuration of an LED circuit, in which there are four LED devices, according to an embodiment.

FIG. 11 and FIG. 12 show two different circuit configuration of the LED circuit 53, in an embodiment in which there are four of the LED devices 52, according to the present teachings. In both circuit configurations, LED1, LED2, LED3, and LED4 are installed on the board 51. However, not all of resistor R1, resistor R2, and resistor R3 need be installed on the board 51. As was explained with reference to FIG. 10, the locations of LED1. LED2, LED3, and LED4 are fixed on the board 51. In the process of manufacturing the COB light 50 according to the circuit configuration shown in FIG. 11, resistor R2 is installed on the board 51, but resistor R1 and resistor R3 are not installed on the board 51; consequently, LED1, LED2, LED3, and LED4 are electrically connected in series. On the other hand, in the circuit configuration shown in FIG. 12, resistor R1 and resistor R3 are installed on the board 51, resistor R2 is not installed on the board 51; consequently, the LED devices 52 of the first group of LED devices 52, which includes LED1 and LED2, are electrically connected in series, and the LED devices 52 of the second group of LED devices 52, which includes LED3 and LED4, are electrically connected in series.

At the time of manufacturing the COB light 50, either the first circuit configuration 91 or the second circuit configuration 92 can be selected based on the rated voltage of the battery 20 to be mounted on the battery-mounting part 5. In addition, either the series connection of the four LED devices 52 or the parallel connection of the first group of LED devices 52 (LED1, LED2) and the second group of LED devices 52 (LED3, LED4), as was explained with reference to FIG. 11 and FIG. 12, can be selected based on the rated voltage of the battery 20 to be mounted on the battery-mounting part 5.

For example, if the rated voltage of the battery 20 to be mounted on the battery-mounting part 5 is, e.g., 18 V, the first circuit configuration 91 may be selected. On the other hand, if the rated voltage of the battery 20 mounted on the battery-mounting part 5 is, e.g., 36 V, the second circuit configuration 92 may be selected.

Figure 13:
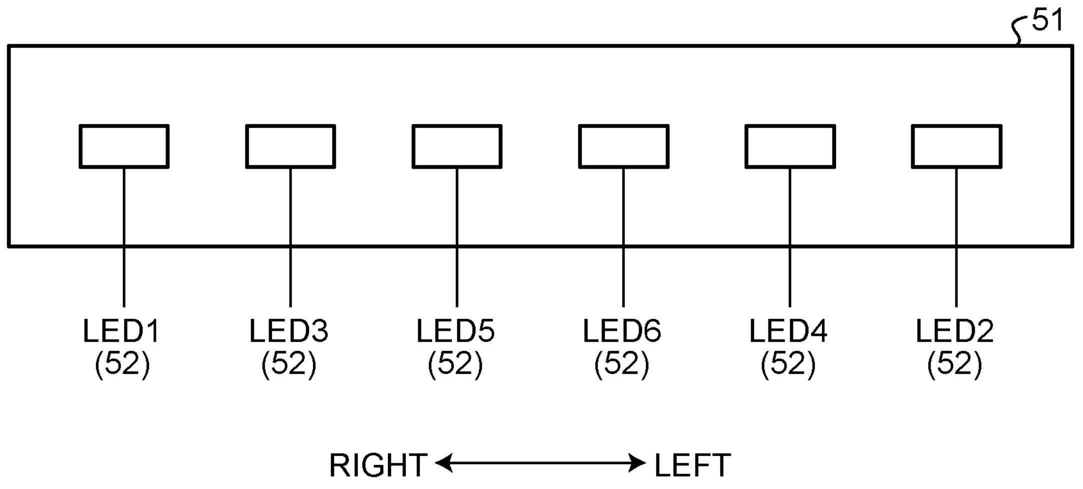
FIG. 13 shows the LED devices, which are installed on the board, according to an embodiment.

FIG. 13 shows the LED devices 52, which are installed on the board 51, according to a modification of the above-described embodiment. In the modified example shown in FIG. 13, six of the LED devices 52 are installed on the front surface of the board 51 spaced apart in the left-right direction; in the explanation below, from among the six LED device 52, the LED device 52 disposed most on the right side is called LED1 as appropriate, the LED device 52 disposed on the right side following LED1 is called LED3 as appropriate, the LED device 52 disposed on the right side following LED3 is called LED5 as appropriate, the LED device 52 disposed on the right side following LED5 is called LED6 as appropriate, the LED device 52 disposed on the right side following LED6 is called LED4 as appropriate, and the LED device 52 disposed most on the left side among the six LED devices 52 is called LED2 as appropriate.

Figure 14:
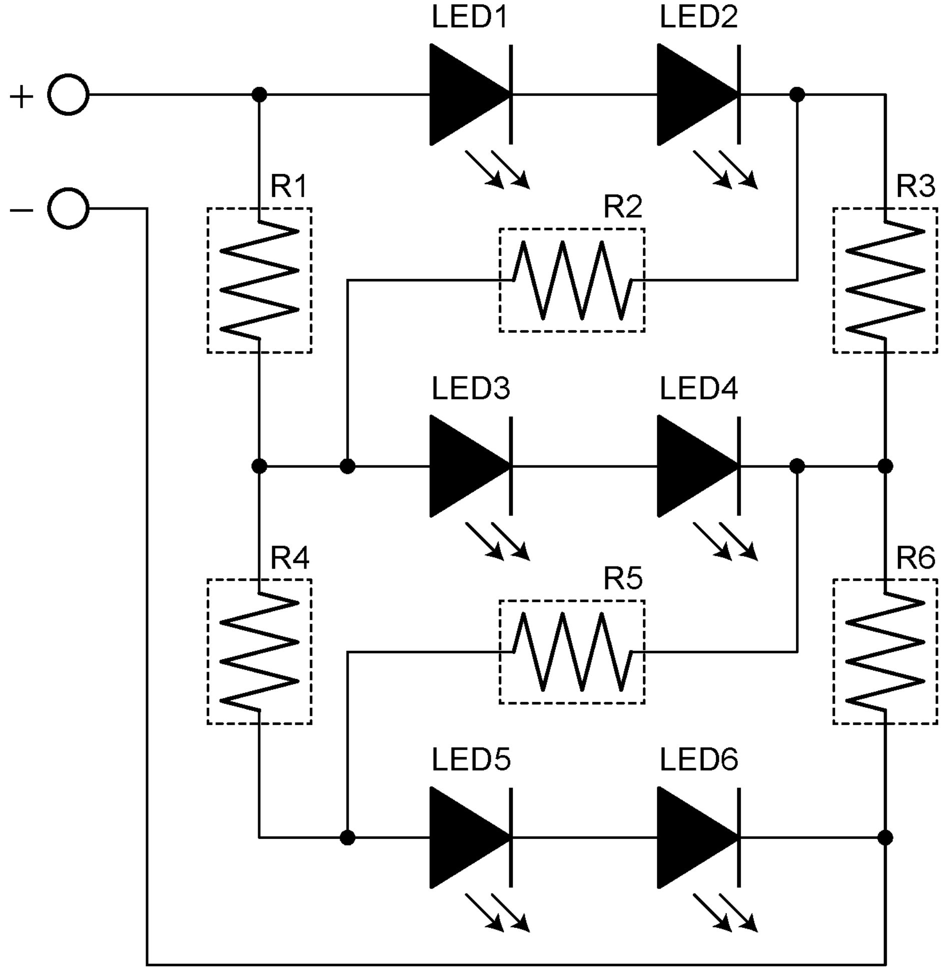
FIG. 14 shows an overall circuit configuration of an LED circuit, in which there are six LED devices, according to an embodiment.

FIG. 14 shows an overall circuit configuration of the LED circuit 53, in an embodiment in which there are six of the LED devices 52, according to the present teachings. LED1, LED2, LED3, LED4, LED5, and LED6 are installed on the board 51. Resistor R1, resistor R2, resistor R3, resistor R4, resistor R5, and resistor R6 can be installed on the board 51.

Figure 15:
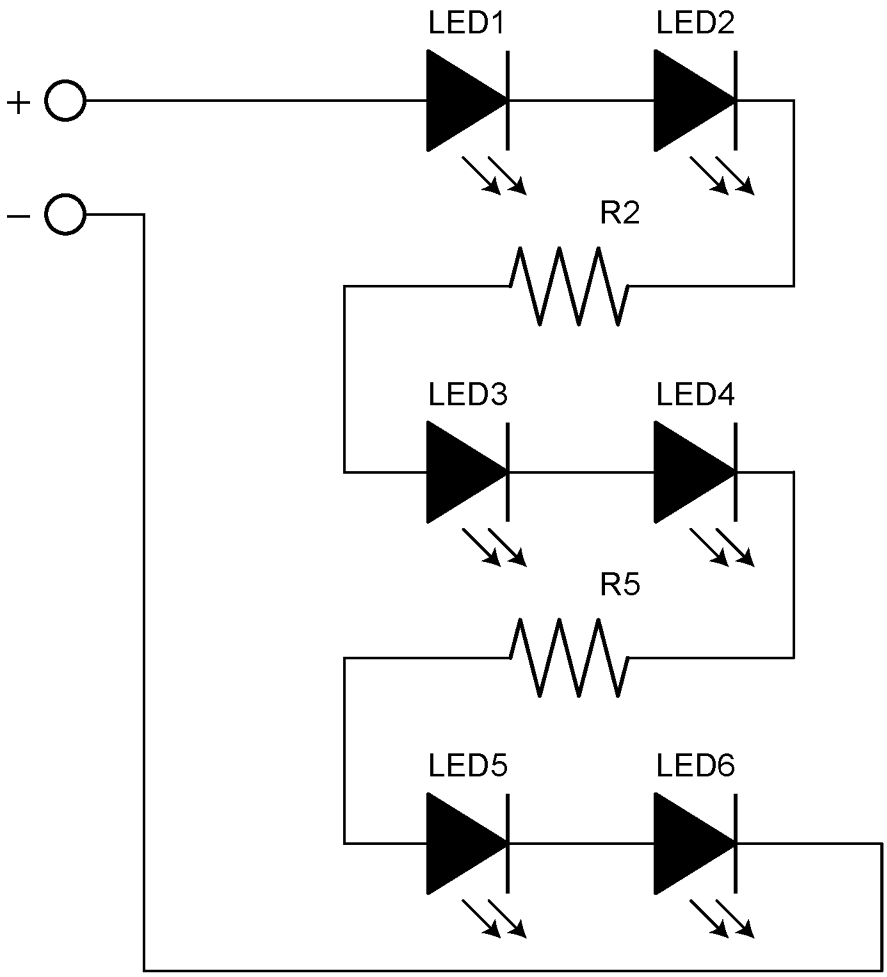
FIG. 15 shows a circuit configuration of an LED circuit, in which there are six LED devices, according to an embodiment.
Figure 16:
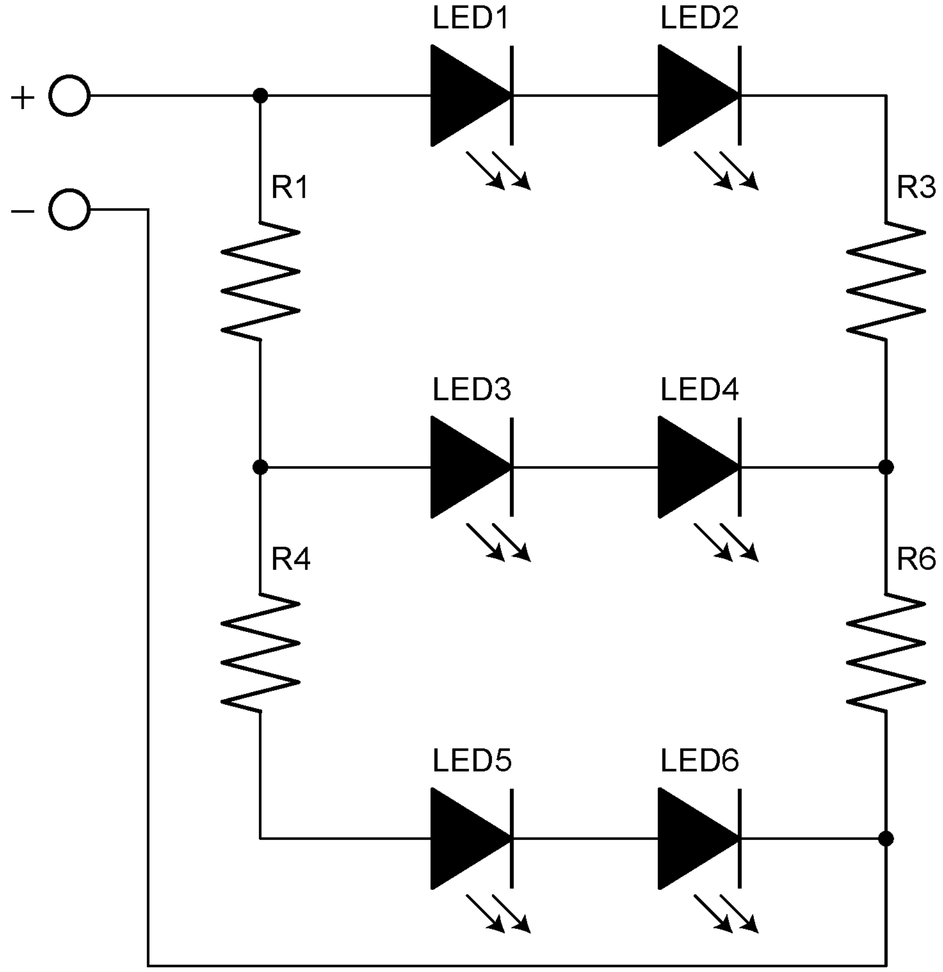
FIG. 16 shows a circuit configuration of an LED circuit, in which there are six LED devices, according to an embodiment.

FIG. 15 and FIG. 16 show two different circuit configurations of the LED circuit 53, in an embodiment in which there are six of the LED devices 52, according to the present teachings. LED1, LED2, LED3, LED4, LED5, and LED6 are installed on the board 51 in both configurations. Two or more of resistor R1, resistor R2, resistor R3, resistor R4, resistor R5, and resistor R6 can be installed on the board 51. The locations of LED1, LED2, LED3, LED4, LED5, and LED6 are fixed on the board 51, as was explained with reference to FIG. 14. Thus, when manufacturing the COB light 50 according to the circuit configuration shown in FIG. 15, resistor R2 and resistor R5 are installed on the board 51; by not installing resistor R1, resistor R3, resistor R4, and resistor R6 on the board 51, LED1, LED2, LED3, LED4, LED5, and LED6 are electrically connected in series. On the other hand, in the circuit configuration shown in FIG. 16, by installing resistor R1, resistor R3, resistor R4, and resistor R6 on the board 51 (and not installing resistors R2 and R5), the LED devices 52 of the first group of LED devices 52, which includes LED1 and LED2, are electrically connected in series, the LED devices 52 of the second group of LED device 52, which includes LED3 and LED4, are electrically connected in series, and the LED devices 52 of the third group of LED devices 52, which includes LED5 and LED6, are electrically connected in series.

Thus, when manufacturing the COB light 50 using six LED devices 52, either the first circuit configuration shown in FIG. 15 or the second circuit configuration shown in FIG. 16 is selected based on the rated voltage of the battery 20 to be mounted on the battery-mounting part 5. Thus, either the series connection of the six LED devices 52 according to FIG. 15 or the parallel connection of the first group of LED devices 52 (LED1, LED2), the second group of LED devices 52 (LED3, LED4), and the third group of LED devices 52 (LED5, LED6) according to FIG. 16 is selected based on the rated voltage of the battery 20 to be mounted on the battery-mounting part 5.

For example, if the rated voltage of the battery 20 to be mounted on the battery-mounting part 5 is relatively low, e.g., 18 V, the first circuit configuration in which the voltage of the battery 20 is applied to the LED circuit 53 without being stepped down may be selected. On the other hand, if the rated voltage of the battery 20 to be mounted on the battery-mounting part 5 is relatively high, e.g., 36 V, the second circuit configuration in which the voltage of the battery 20 is stepped down by the power-supply circuit 18B and then applied to the LED circuit 53 may be selected.

As was explained with reference to FIG. 10 and FIG. 14, by preparing one type of the board 51 in advance, in the step of manufacturing the COB light 50, either the series connection or the parallel connection of the plurality of LED devices 52 is selected based on the rated voltage of the battery 20.

For example, in an embodiment in which six of the LED devices 52 are electrically connected in series, the first circuit configuration in which the voltage of the battery 20 is applied to the LED circuit 53 without being stepped down is selected from the viewpoint of a forward voltage drop of each LED. On the other hand, in an embodiment in which the first group of LED devices 52, the second group of LED devices 52, and the third group of LED devices 52 are electrically connected in parallel, the second circuit configuration can be selected. This is because LEDs connected in parallel can be driven with a relatively low voltage as compared with LEDs connected in series.

If the rated voltage of the battery 20 to be held by the battery-holding part 23 of the housing 2 is 25.2 V or more, the first circuit configuration may be used or the second circuit configuration may be used. If the rated voltage of the battery 20 is 25.2 V or more and there are four of the LED devices 52, the four LED devices 52 may be electrically connected in series (FIG. 11), or the first group of LED devices 52 and the second group of LED devices 52 may be electrically connected in parallel (FIG. 12). If the rated voltage of the battery 20 is 25.2 V or more and there are six of the LED devices 52, the six LED devices 52 may be electrically connected in series (FIG. 15) or the first group of LED devices 52, the second group of LED devices 52, and the third group of LED devices 52 may be electrically connected in parallel (FIG. 16). The rated voltage of the battery 20 may be, e.g., 36 V or may be 40 V.

If the rated voltage of the battery 20 to be held by the battery-holding part 23 of the housing 2 is 21.6 V or more, it is preferable to use the first circuit configuration 91. If the rated voltage of the battery 20 is 21.6 V or more and there are six of the LED devices 52, is preferable to electrically connect the six LED devices 52 in series according to FIG. 15.

Effects

In the embodiments as explained above, the driver-drill 1 comprises: the motor 6 comprising the stator 61 and the rotor 62, which is rotatable relative to the stator 61; the output part 8, which is disposed more forward than the motor 6 and is rotated by the motor 6; the motor-housing part 21, which houses the motor 6; the grip part 22, which is disposed downward of the motor-housing part 21; the battery-holding part 23, which is disposed downward of the grip part 22; and the COB light 50, which is disposed on the battery-holding part 23.

According to the above-mentioned configuration, high-intensity light is emitted from the COB light 50, which is disposed more downward than the grip part 22. Thereby, the work object can be brightly illuminated. In addition, a shadow or shadows of the tool accessory tend(s) not to be formed on the work object. Consequently, it becomes easier for the user to visually perceive the work object during a power tool operation.

In one or more of the above-described embodiments, the COB light 50 is disposed on a front portion of the battery-holding part 23.

According to the above-mentioned configuration, a work object, which is forward of the battery-holding part 23, can be brightly illuminated.

In one or more of the above-described embodiments, the COB light 50 comprises the board 51 and the LED devices 52, which are installed on a front surface of the board 51; and the board 51 is elongate in the left-right direction.

According to the above-mentioned configuration, a large area of the work object can be illuminated.

In one or more of the above-described embodiments, the LED devices 52 are installed spaced apart in the left-right direction.

According to the above-mentioned configuration, although a portion of the light emitted from the LED devices 52 is radiated onto the tool accessory, because the LED devices 52 are installed spaced apart in the left-right direction, the shadows of the tool accessory cancel each other out. As a result, any shadow that still forms (if any) on the work object is no longer conspicuous. Accordingly, it becomes easier for the user to visually perceive the work object during a power tool operation.

In one or more of the above-described embodiments, the driver-drill 1 comprises the optical member 57, which is disposed more forward than the COB light 50 and comprises the light-transmitting part 57A, through which light emitted from the COB light 50 transmits.

According to the above-mentioned configuration, the light that has transmitted through the optical member 57 is radiated onto the work object.

In one or more the above-described embodiments, the optical member 57 is disposed in the light opening 29, which is provided in the battery-holding part 23.

According to the above-mentioned configuration, the light that has transmitted through the optical member 57 is radiated onto the work object without loss.

In one or more of the above-described embodiments, the optical member 57 is made of a polycarbonate resin that contains a white diffusing agent.

According to the above-mentioned configuration, because the optical member 57 has a milky white color, the outer shape of devices, such as the LED devices 52 of the COB light 50, are difficult to visually perceive from outside of the driver-drill 1. Because the outer shape of the devices is difficult to visually perceive, the design aesthetics of the driver-drill 1 are improved.

In one or more of the above-described embodiments, the light transmittance of the optical member 57 is 40% or more and 70% or less.

According to the above-mentioned configuration, the outer shape of the devices of the COB light 50 are difficult to visually perceive from outside of the driver-drill 1. Because the outer shape of the devices is difficult to visually perceive, the design aesthetics of the driver-drill 1 are improved.

In one or more of the above-described embodiments, the optical member 57 has: the incident surface 57G, on which light from the COB light 50 impinges; the fully reflecting surface 57F, which fully reflects light from the COB light 50; and the emergent surface 57H, from which light from the incident surface 57G and light from the fully reflecting surface 57F emerge.

According to the above-mentioned configuration, although a portion of the light emitted from the COB light 50 does not impinge the incident surface 57G of the light-transmitting part 57A, because the light emitted from the COB light 50 is reflected by the fully reflecting surface 57F and emerges from the emergent surface 57H, loss of light emitted from the COB light 50 is reduced.

In one or more of the above-described embodiments, the fully reflecting surface 57F is disposed more upward than the incident surface 57G.

According to the above-mentioned configuration, although a portion of the light emitted from the COB light 50 does not advance upward of the light-transmitting part 57A, because the light emitted from the COB light 50 is reflected by the fully reflecting surface 57F and emerges from the emergent surface 57H, loss of light emitted from the COB light 50 is reduced.

In one or more of the above-described embodiments, the optical member 57 comprises the upper-side enclosing part 57B, which extends rearward from the upper-end portion of the light-transmitting part 57A, and the upper-side protruding part 57D, which protrudes upward from the upper-side enclosing part 57B. The fully reflecting surface 57F is disposed on the upper-side protruding part 57D.

According to the above-mentioned configuration, the upper-side protruding part 57D, which has the fully reflecting surface 57F, can be caused to function as a positioning part of the optical member 57 with respect to the battery-holding part 23.

In one or more of the above-described embodiments, the optical member 57 comprises the lower-side enclosing part 57C, which extends rearward from the lower-end portion of the light-transmitting part 57A, and the lower-side protruding part 57E, which protrudes downward from the lower-side enclosing part 57C.

According to the above-mentioned configuration, the lower-side protruding part 57E can be caused to function as a (another) positioning part of the optical member 57 with respect to the battery-holding part 23. In addition, the upper-side protruding part 57D and the lower-side protruding part 57E can be caused to function as rotation-stop parts of the optical member 57 with respect to the battery-holding part 23.

In one or more of the above-described embodiments, the COB light 50 comprises the board 51 and the LED devices 52, which are installed on a front surface of the board 51. An angle formed between rotational axis AX of the motor 6 and a normal line to the front surface of the board 51 is 5° or more and 20° or less.

According to the above-mentioned configuration, the work object can be properly illuminated, centered on the tool accessory.

In one or more of the above-described embodiments, the COB light 50 comprises the board 51 and the LED devices 52, which are installed on a front surface of the board 51. At least four of the LED devices 52 are installed spaced apart in the left-right direction. The LED devices 52 of the first group of the LED devices 52, which includes the first LED device 52 and the second LED device 52, are connected in series; the LED devices 52 of the second group of the LED devices 52, which includes the third LED device 52 and the fourth LED device 52, are connected in series; and the first group of LED devices 52 and the second group of LED devices 52 are connected in parallel. In the left-right direction, the second group of LED devices 52 is disposed between the first LED device 52 and the second LED device 52.

According to the above-mentioned configuration, even if an imbalance occurs between the luminous intensity of the light emitted from the first group of LED devices 52 and the luminous intensity of the light emitted from the second group of LED devices 52 due to an imbalance in the electric currents supplied to the COB light 50, the difference between the left and right luminous intensities at the work object can be made small.

In one or more of the above-described embodiments, the LED devices 52 of the third group of the LED devices 52, which includes the fifth LED device 52 and the sixth LED device 52, are electrically connected in series; the first group of LED devices 52, the second group of LED devices 52, and the third group of LED devices 52 are electrically connected in parallel; and in the left-right direction, the second group of LED devices 52 is disposed between the first LED device 52 and the second LED device 52, and the third group of LED devices 52 is disposed between the third LED device 52 and the fourth LED device 52.

According to the above-mentioned configuration, even if an imbalance occurs between the luminous intensity of the light emitted from the first group of LED devices 52 and the luminous intensity of the light emitted from the second group of the LED devices 52 due to an imbalance in the electric currents supplied to the COB light 50, the luminous-flux intensities at the work object can be made uniform.

In one or more the above-described embodiments, the driver-drill 1 comprises: the motor 6 comprising the stator 61 and the rotor 62, which is rotatable relative to the stator 61; the output part 8, which is rotated by the rotor 62; the housing 2, which houses the motor 6; and the COB light 50, which is disposed on the housing 2. The rated voltage of the battery 20 held by the battery-holding part 23 of the housing 2 is 25.2 V or more.

According to the above-mentioned configuration, because the COB light 50 can be driven at high voltage, the work object can be brightly illuminated. Consequently, it becomes easier for the user to visually perceive the work object during a power tool operation.

In one or more of the above-described embodiments, the driver-drill 1 comprises: the motor 6 comprising the stator 61 and the rotor 62, which is rotatable relative to the stator 61; the output part 8, which is rotated by the rotor 62; the housing 2, which houses the motor 6; and the COB light 50, which is disposed on the housing 2. The rated voltage of the battery 20 held by the battery-holding part 23 of the housing 2 is 21.6 V or more; and the voltage of the battery 20 is applied, without being stepped down, to the COB light 50.

According to the above-mentioned configuration, because the COB light 50 can be driven at high voltage, the work object can be brightly illuminated. Consequently, it becomes easier for the user to visually perceive the work object during a power tool operation.

In one or more of the above-described embodiments, the COB light 50 comprises the board 51 and the LED devices 52, which are installed on the board 51. At least six of the LED devices 52 are installed. The at least six LED devices 52 are electrically connected in series.

According to the above-mentioned configuration, owing to the at least six LED devices 52, which are connected in series, the work object can be brightly illuminated. Consequently, it becomes easier for the user to visually perceive the work object during a power tool operation.

OTHER EMBODIMENTS

Figure 17:
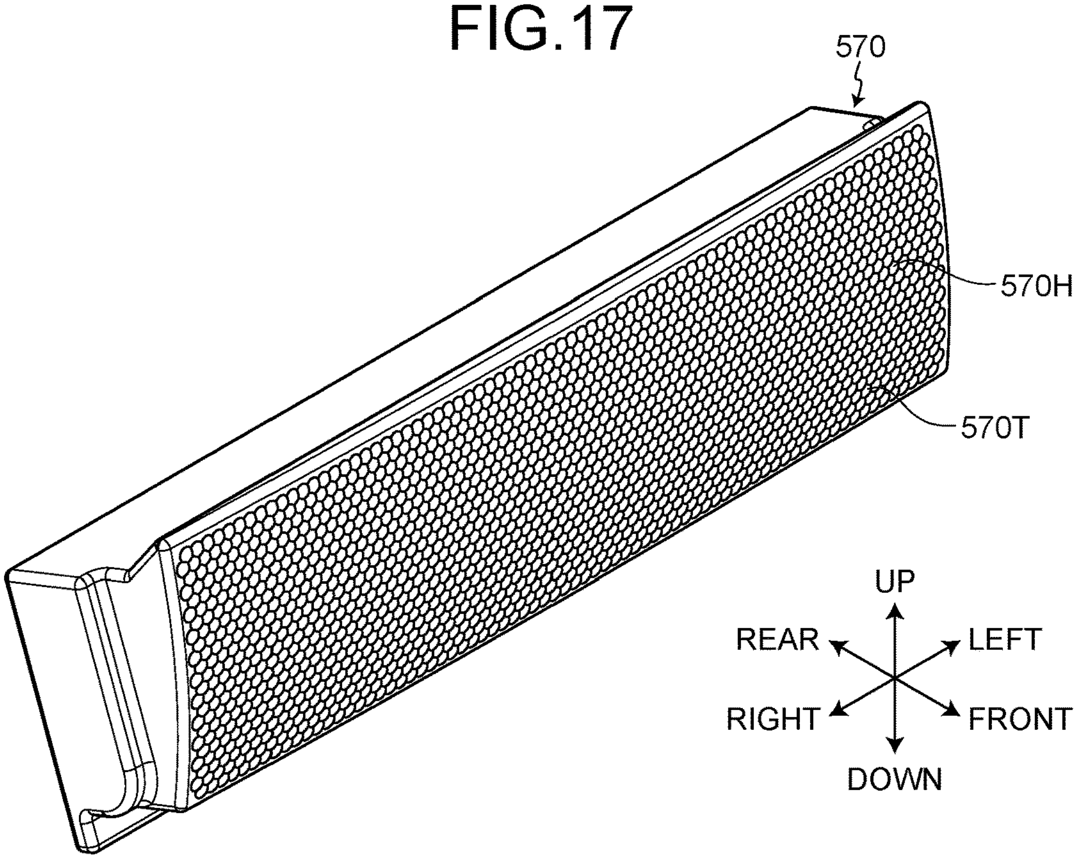
FIG. 17 is an oblique view that shows an optical member according to a modified embodiment.
Figure 18:
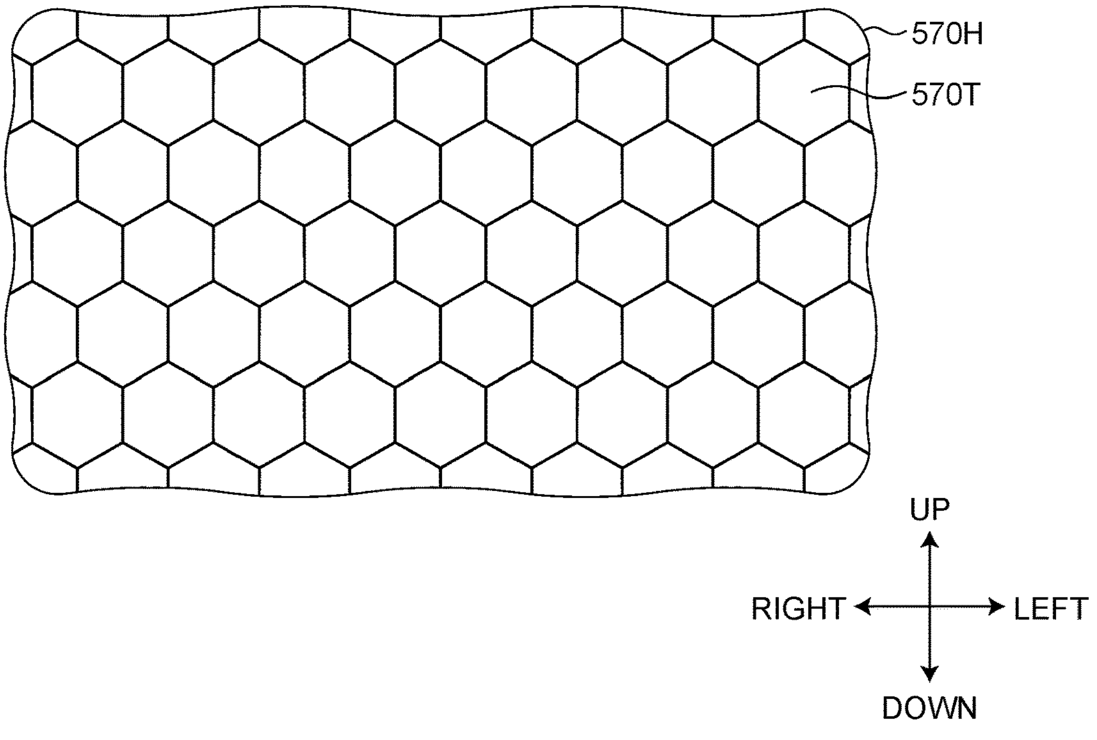
FIG. 18 is a partial, enlarged view of the optical member according to the modified embodiment.

FIG. 17 is an oblique view that shows an optical member 570 according to a modified embodiment. FIG. 18 is a partial, enlarged view of the optical member 570 according to the modified embodiment. As shown in FIG. 17 and FIG. 18, a plurality of protruding parts 570T may be provided on an emergent surface 570H of the optical member 570. The protruding parts 570T are provided without gaps between the protruding parts 570T. The height of each of the protruding parts 570T is approximately 0.1 mm. The optical member 570 does not contain a diffusing agent.

Because of the optical member 570 does not contain a diffusing agent, loss of luminous-flux intensity is small. Thereby, it is possible to brightly illuminate the work object, and visibility is improved.

By providing the emergent surface 570H with an uneven shape, the light can be diffused by the emergent surface 570H, and thereby the shadow(s) of the bit (tool accessory) can be diffused. Thereby, the uniformity ratio of illuminance of the work object becomes high, and thereby visibility is improved. In addition, because the pattern of the board 51 is not visible from its external appearance, the design aesthetics are good.

In addition, because the optical member 570 does not contain a diffusing agent, the diffusion degree can be changed simply by changing the dimensions of the unevenness.

It is noted that the shape of the optical member 570 is not limited to an oblong shape and is also applicable to shapes such as an annular COB.

When the height of each of the protruding parts 570T is less than 0.05 mm, the diffusion degree is small and it becomes easy to see the board 51 from the external appearance; consequently, the height of each of the protruding parts 570T needs to be 0.1 mm or more. In addition, when the height of each of the protruding parts 570T is set to 0.3 mm or more, stray light increases, and consequently loss of luminous-flux intensity becomes large.

Because the optical member 570 does not contain a diffusing agent, the cost of the optical member 570 is low.

In addition, because the optical member 570 does not contain a diffusing agent, there is a wide range of options for the material of the optical member 570, and consequently mass producibility is stable (reliably reproducible).

In all of the embodiments described above, the power tool is the driver-drill 1. However, the present teachings are equally applicable to a wide variety of power tools such as a polisher, a pin cutter, a hammer drill, an impact driver, or an impact wrench, without limitation.

Figure 19:
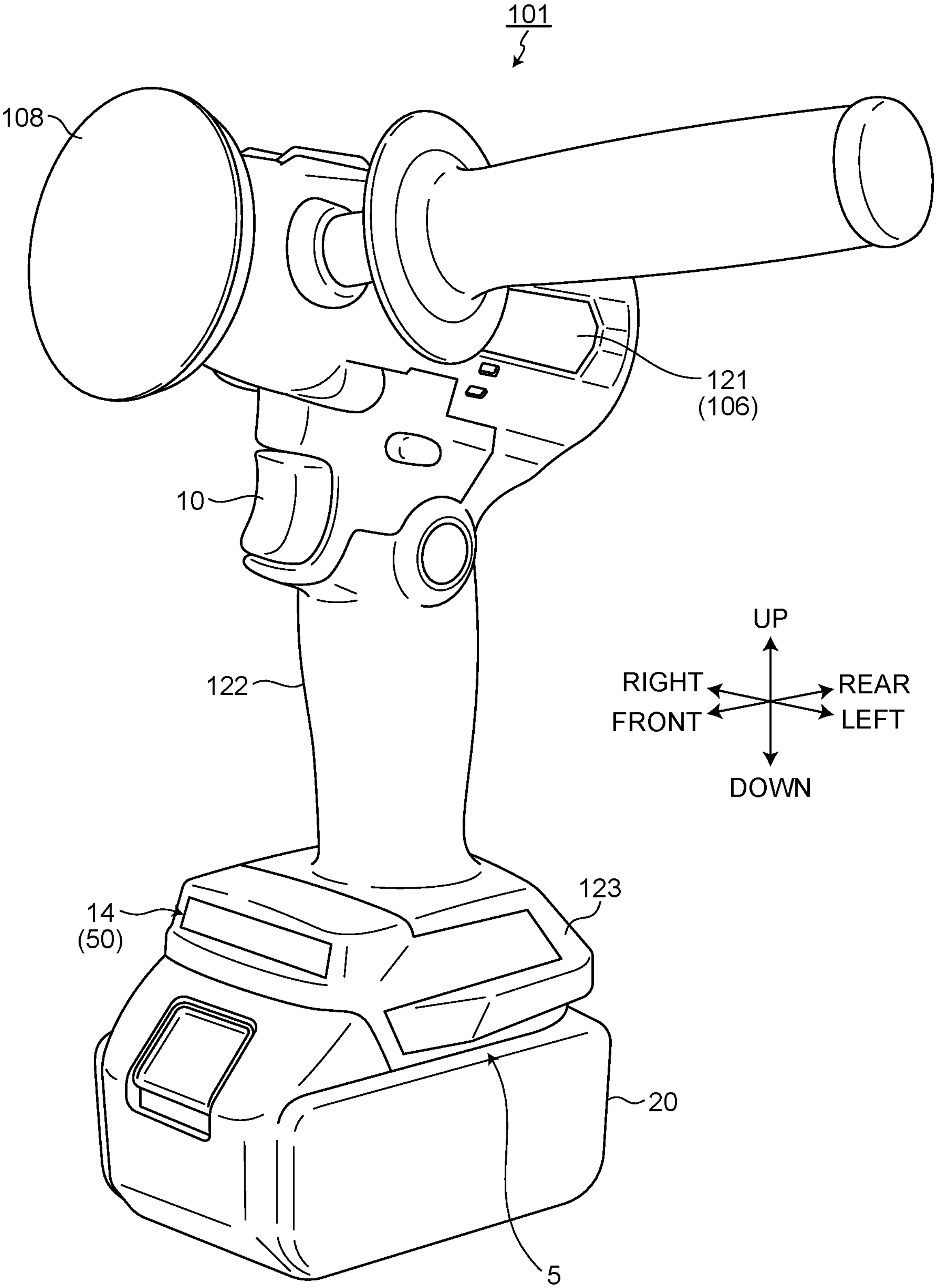
FIG. 19 is an oblique view, viewed from the front, that shows a polisher according to another embodiment of the present teachings.

FIG. 19 is an oblique view, viewed from the front, that shows a polisher 101 according to a further embodiment of the present teachings. The polisher 101 comprises: a motor 106; an abrading part 108 (e.g., a polishing or sanding pad attached to an output shaft), which is disposed more forward than the motor 106 and is rotated by the motor 106; a motor-housing part 121, which houses the motor 106; a grip part 122, which is disposed downward of the motor-housing part 121; a battery-holding part 123, which is disposed downward of the grip part 122; and a light unit 14, which is disposed on the battery-holding part 123. The light unit 14 comprises any one of the COB lights 50 described above. The battery-holding part 123 holds the battery 20. Because the COB light 50 can brightly illuminate the work object of the polisher 101, it becomes easier for the user to visually perceive the work object during a polishing operation.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tools, such as driver-drills and polishers.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Driver-drill (power tool)
2 Housing
2L Left housing
2R Right housing
2S Screw
3 Rear cover
3S Screw
4 Casing
4A First casing
4B Second casing
4C Bracket plate
4D Stop plate
4E Screw
4S Screw
5S Screw
5 Battery-mounting part
6 Motor
7 Power-transmission mechanism
8 Output part (output shaft)
9 Fan
10 Trigger lever
11 Forward/reverse-change lever
12 Speed-changing lever
13 Mode-changing ring
14 Light unit
15 Interface panel
16 Dial
17 Trigger-signal generating circuit
18 Controller
18A Controller board
18B Power-supply circuit
18C Control circuit
18D Constant-current circuit
19A Air-intake port
19B Air-exhaust port
20 Battery
21 Motor-housing part
22 Grip part
23 Battery-holding part
24 Light-holding part
25A Manipulation apparatus
25B Display apparatus
26 Controller case
27 Panel opening
28 Dial opening
29 Light opening
30 Speed-reducing mechanism
31 First planetary-gear mechanism
31C First carrier
31P Planet gear
31R Internal gear
31S Pinion gear
32 Second planetary-gear mechanism
32C Second carrier
32P Planet gear
32R Internal gear
32S Sun gear
33 Third planetary-gear mechanism
33C Third carrier
33P Planet gear
33R Internal gear
33S Sun gear
34 Speed-changing ring
34T Protruding part
35 Coupling ring
36 Coil spring
40 Hammer mechanism
41 First cam
42 Second cam
43 Hammer-changing ring
43S Opposing part
43T Projection part
44 Stop ring
45 Support ring
46 Steel ball
47 Washer
48 Cam ring
49 Mode-detection ring
49M Permanent magnet
50 COB light (chip-on-board light-emitting diode)
51 Board
52 LED device (light-emitting device)
53 LED circuit
54 Bank
55 Fluorescent body
57 Optical member
57A Light-transmitting part
57B Upper-side enclosing part
57C Lower-side enclosing part
57D Upper-side protruding part
57E Lower-side protruding part
57F Fully reflecting surface
57G Incident surface
57H Emergent surface
61 Stator
61A Stator core
61B Front insulator
61C Rear insulator
61D Coil
61E Sensor circuit board
61F Fusing terminal
61G Short-circuiting member
62 Rotor
62A Rotor core
62B Permanent magnet
63 Rotor shaft
64 Bearing
65 Bearing
81 Spindle
81F Flange portion
82 Chuck
83 Bearing
84 Bearing
85 Lock cam
86 Lock ring
87 Coil spring
91 First circuit configuration
92 Second circuit configuration
101 Polisher (power tool)
106 Motor
108 Abrading part (output shaft)
121 Motor-housing part
122 Grip part
123 Battery-holding part
570 Optical member
570H Emergent surface
570T Protruding part
AX Rotational axis

The invention claimed is:

1. A power tool comprising:

a motor comprising a stator and a rotor, which is rotatable relative to the stator;

an output part disposed more forward than the motor and configured to be rotated by the motor;

a motor-housing part, which houses the motor;

a grip part disposed downward of the motor-housing part;

a battery-holding part disposed downward of the grip part;

a COB light disposed on the battery-holding part; and an optical member disposed more forward than the COB light and comprising a light-transmitting part configured to transmit light emitted from the COB light, wherein the optical member has: an incident surface, on which light from the COB light impinges; a fully reflecting surface, which fully reflects light from the COB light; and an emergent surface, from which light from the incident surface and light from the fully reflecting surface emerge.

2. The power tool according to claim 1, wherein the COB light is disposed on a front portion of the battery-holding part.

3. The power tool according to claim 1, wherein:

the COB light comprises a board and one or more LED devices installed on a front surface of the board; and the board is elongate in a left-right direction.

4. The power tool according to claim 1, wherein:

the COB light comprises a board and multiple LED devices installed in a spaced apart manner on a front surface of the board; and the board is elongate in a left-right direction.

5. The power tool according to claim 1, wherein the optical member is disposed in a light opening provided in the battery-holding part.

6. The power tool according to claim 1, wherein the optical member is made of a polycarbonate resin that contains a white diffusing agent.

7. The power tool according to claim 6, wherein the light transmittance of the optical member is 40% or more and 70% or less.

8. The power tool according to claim 1, wherein the fully reflecting surface is disposed more upward than the incident surface.

9. The power tool according to claim 1, wherein:

the optical member comprises an upper-side enclosing part, which extends rearward from an upper-end portion of the light-transmitting part, and an upper-side protruding part, which protrudes upward from the upper-side enclosing part; and the fully reflecting surface is disposed on the upper-side protruding part.

10. The power tool according to claim 1, wherein the optical member comprises a lower-side enclosing part, which extends rearward from a lower-end portion of the light-transmitting part, and a lower-side protruding part, which protrudes downward from the lower-side enclosing part.

11. The power tool according to claim 1, wherein:

the COB light comprises a board and one or more LED devices installed on a front surface of the board; and an angle formed between a rotational axis of the motor and a normal line to the front surface of the board is 5° or more and 20° or less.

12. The power tool according to claim 1, wherein:

the COB light comprises a board and at least first, second, third and fourth LED devices installed on a front surface of the board spaced apart in a left-right direction;

a first group of the LED devices, which includes the first LED device and the second LED device, are electrically connected in series;

a second group of the LED devices, which includes the third LED device and the fourth LED device, are electrically connected in series;

the first group of LED devices and the second group of LED devices are electrically connected in parallel; and in the left-right direction, the second group of LED devices is disposed between the first LED device and the second LED device.

13. The power tool according to claim 12, further comprising:

a third group of the LED devices, which includes a fifth LED device and a sixth LED device, electrically connected in series;

wherein:

the first group of LED devices, the second group of LED devices, and the third group of LED devices are electrically connected in parallel; and in the left-right direction, the second group of LED devices is disposed between the first LED device and the second LED device, and the third group of LED devices is disposed between the third LED device and the fourth LED device.

14. The power tool according to claim 1, wherein the rated voltage of a battery to be held by the battery-holding part is 25.2 V or more.

15. The power tool according to claim 1, wherein:

the rated voltage of a battery to be held by the battery-holding part is 21.6 V or more; and the voltage of the battery is applied, without being stepped down, to the COB light.

16. A power tool comprising:

a motor comprising a stator and a rotor, which is rotatable relative to the stator;

an output part disposed more forward than the motor and configured to be rotated by the motor;

a motor-housing part, which houses the motor;

a grip part disposed downward of the motor-housing part;

a battery-holding part disposed downward of the grip part;

a COB light disposed on the battery-holding part; and an optical member disposed more forward than the COB light and comprising a light-transmitting part configured to transmit light emitted from the COB light, wherein the optical member comprises a lower-side enclosing part, which extends rearward from a lower-end portion of the light-transmitting part, and a lower-side protruding part, which protrudes downward from the lower-side enclosing part.

17. The power tool according to claim 16, wherein the COB light is disposed on a front portion of the battery-holding part.

18. The power tool according to claim 17, wherein:

the COB light comprises a board and one or more LED devices installed on a front surface of the board; and the board is elongate in a left-right direction.

19. A power tool comprising:

a motor comprising a stator and a rotor, which is rotatable relative to the stator;

an output part disposed more forward than the motor and configured to be rotated by the motor;

a motor-housing part, which houses the motor;

a grip part disposed downward of the motor-housing part;

a battery-holding part disposed downward of the grip part; and a COB light disposed on the battery-holding part, wherein:

the COB light comprises a board and at least first, second, third and fourth LED devices installed on a front surface of the board spaced apart in a left-right direction;

a first group of the LED devices, which includes the first LED device and the second LED device, are electrically connected in series;

a second group of the LED devices, which includes the third LED device and the fourth LED device, are electrically connected in series;

the first group of LED devices and the second group of LED devices are electrically connected in parallel; and in the left-right direction, the second group of LED devices is disposed between the first LED device and the second LED device.

20. The power tool according to claim 19, further comprising:

a third group of the LED devices, which includes a fifth LED device and a sixth LED device, electrically connected in series;

wherein:

the first group of LED devices, the second group of LED devices, and the third group of LED devices are electrically connected in parallel; and in the left-right direction, the second group of LED devices is disposed between the first LED device and the second LED device, and the third group of LED devices is disposed between the third LED device and the fourth LED device.

* * * * *